US012619824B2

(12) United States Patent (10) Patent No.: US 12,619,824 B2
Yoon et al. (45) Date of Patent: May 5, 2026

(54) METHOD FOR GENERATING SUMMARY AND SYSTEM THEREFOR

(71) Applicants: SAMSUNG SDS CO., LTD., Seoul (KR); SEOUL NATIONAL UNIVERSITY R&DB FOUNDATION, Seoul (KR)

(72) Inventors: Sung Roh Yoon, Seoul (KR); Bong Kyu Hwang, Seoul (KR); Ju Dong Kim, Seoul (KR); Jae Woong Yun, Seoul (KR); Hyun Jae Lee, Seoul (KR); Hyun Jin Choi, Seoul (KR); Jong Yoon Song, Seoul (KR); Noh Il Park, Gwacheon-si (KR); Seong Ho Joe, Seoul (KR); Young June Gwon, Seoul (KR)

(73) Assignees: SAMSUNG SDS CO., LTD., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 221 days.

(21) Appl. No.: 18/384,179

(22) Filed: Oct. 26, 2023

(65) Prior Publication Data

US 2024/0143927 A1 May 2, 2024

(30) Foreign Application Priority Data

Oct. 28, 2022 (KR) ........................ 10-2022-0139083

(51) Int. Cl.
*G06F 40/295* (2020.01)
*G06F 40/284* (2020.01)

(52) U.S. Cl.
CPC .......... *G06F 40/295* (2020.01); *G06F 40/284* (2020.01)

(58) Field of Classification Search
None
See application file for complete search history.

(56) References Cited

U.S. PATENT DOCUMENTS

2022/0004712 A1    1/2022    Bahuleyan et al.
2023/0004589 A1*   1/2023    Wu ........................ G06F 16/345

FOREIGN PATENT DOCUMENTS

KR    10-2022-0043505 A    4/2022
KR    10-2022-0079163 A    6/2022

OTHER PUBLICATIONS

Saito et al., "Abstractive Summarization with Combination of Pre-trained Sequence-to-Sequence and Saliency Models" (Year: 2020).*

(Continued)

*Primary Examiner* — Paras D Shah
*Assistant Examiner* — Jacob B Vogt
(74) *Attorney, Agent, or Firm* — Sughrue Mion, PLLC

(57) ABSTRACT

Provided are a method for generating a summary and a system therefor. The method according to some embodiments may include calculating a likelihood loss for a summary model using a first text sample and a first summary sentence corresponding to the first text sample, calculating an unlikelihood loss for the summary model using a second text sample and the first summary sentence, the second text (Continued)

sample being a negative sample generated from the first text sample, and updating the summary model based on the likelihood loss and the unlikelihood loss.

16 Claims, 16 Drawing Sheets

(56)            References Cited

OTHER PUBLICATIONS

Bahuleyan et al., "Diverse Keyphrase Generation with Neural Unlikelihood Training" (Year: 2020).*
Li et al., "Don't Say That! Making Inconsistent Dialogue Unlikely with Unlikelihood Training" (Year: 2020).*
Cao and Wang, "CLIFF: Contrastive Learning for Improving Faithfulness and Factuality in Abstractive Summarization" (Year: 2021).*
Lee et al., "Contrastive Learning with Adversarial Perturbations for Conditional Text Generation" (Year: 2021).*
Zheng et al., "Enhanced Seq2Seq Autoencoder via Contrastive Learning for Abstractive Text Summarization" (Year: 2021).*
Liu et al., "Topic-Aware Contrastive Learning for Abstractive Dialogue Summarization" (Year: 2021).*
Xie et al., "Factual Consistency Evaluation for Text Summarization via Counterfactual Estimation" 2022 (Year: 2021).*
King et al., "Don't Say What You Don't Know: Improving the Consistency of Abstractive Summarization by Constraining Beam Search" (Year: 2022).*
Liu et al. "Summarizing Dialogues with Negative Cues" (Year: 2022).*
Lee et al., "Masked Summarization to Generate Factually Inconsistent Summaries for Improved Factual Consistency Checking" (Year: 2022).*
Wen et al., "PRIMERA: Pyramid-based Masked Sentence Pre-training for Multi-document Summarization" (Year: 2022).*
West et al., "Probing Factually Grounded Content Transfer with Factual Ablation" (Year: 2022).*
Cao, Shuyang et al., "CLIFF: Contrastive Learning for Improving Faithfulness and Factuality in Abstractive Summarization", arXiv:2109.09209v1 [cs.CL], Sep. 19, 2021. (17 pages total).
Nair, Pranav Ajit et al., "On Reducing Repetition in Abstractive Summarization", Proceedings of the Student Research Workshop associated with RANLP-2021, pp. 126-134, held online, Sep. 1-3, 2021.

* cited by examiner

S31

CALCULATE LIKELIHOOD LOSS USING FIRST
TEXT SAMPLE AND FIRST SUMMARY SENTENCE — S61

CALCULATE UNLIKELIHOOD LOSS USING SECOND
TEXT SAMPLE AND FIRST SUMMARY SENTENCE — S62

UPDATE SUMMARY MODEL BASED ON
LIKELIHOOD LOSS AND UNLIKELIHOOD LOSS — S63

METHOD FOR GENERATING SUMMARY AND SYSTEM THEREFOR

CROSS-REFERENCE TO RELATED APPLICATION

This application claims priority from Korean Patent Application No. 10-2022-0139083 filed on Oct. 26, 2022 in the Korean Intellectual Property Office, and all the benefits accruing therefrom under 35 U.S.C. 119, the contents of which in its entirety are herein incorporated by reference.

BACKGROUND

1. Technical Field

The disclosure relates to a method for generating a summary and a system therefor, and more particularly, to a method for generating a summary sentence for an original text in an abstractive or generative summary manner and a system therefor.

2. Description of the Related Art

Text summarization manners are largely divided into an extractive summarization manner and an abstractive summarization (or generative summarization) manner. The extractive summarization manner is a manner of extracting keywords or core sentences from an original text to generate a summary sentence, and the abstractive summarization manner is a manner of generating new keywords or sentences based on a core context of an original text to summarize the original text. It has been known that difficulty of the abstractive summarization manner is much higher than that of the extractive summarization manner.

Meanwhile, as deep learning technology related to natural language processing develops rapidly, methods for generating a summary sentence in the abstractive summarization manner through a deep learning model have been recently proposed. However, the proposed methods have a problem that they cannot guarantee factual consistency of the summary sentence for the original text. That is, the deep learning model changes keywords (or sentences) representing a main factual relationship of the original text or generates keywords (or a sentences) representing a new factual relationship, and accordingly, there is a problem that important information of the original text is distorted or information that does not exist in the original text is included in the summary sentence. Such a problem has been recognized as a significantly serious problem due to characteristics of a summary task that refines important information in the original text.

SUMMARY

Aspects of the disclosure provide a method capable of accurately generating a summary sentence for an original text in an abstractive or generative summarization manner, and a system for performing the method.

Aspects of the disclosure also provide a method capable of accurately generating a high-quality summary sentence having high factual consistency, and a system for performing the method.

Aspects of the disclosure also provide a method and evaluation metrics capable of accurately evaluating performance of a summary model related to factual consistency.

However, aspects of the disclosure are not restricted to those set forth herein. The above and other aspects of the disclosure will become more apparent to one of ordinary skill in the art to which the disclosure pertains by referencing the detailed description of the disclosure given below.

According to some embodiments of the disclosure, there is provided a method for generating a summary performed by at least one computing device. The method may include calculating a likelihood loss for a summary model using a first text sample and a first summary sentence corresponding to the first text sample, calculating an unlikelihood loss for the summary model using a second text sample and the first summary sentence, the second text sample being a negative sample generated from the first text sample, and updating the summary model based on the likelihood loss and the unlikelihood loss.

In some embodiments, the unlikelihood loss may be calculated based on a difference between a summary sentence of the second text sample generated through the summary model and the first summary sentence, and may be calculated as a smaller value as the difference increases.

In some embodiments, the calculating of the unlikelihood loss may include extracting a main keyword from the first summary sentence, and generating the second text sample by masking a portion associated with the main keyword in the first text sample.

In some embodiments, the main keyword may be extracted by performing part-of-speech analysis or named entity recognition on the first summary sentence.

In some embodiments, the main keyword may include a keyword of which a part of speech is a numeral or a proper noun.

In some embodiments, the portion associated with the main keyword may be a token group including a matching token for the main keyword and adjacent tokens of the matching token, a sentence including the matching token, or a paragraph including the matching token.

In some embodiments, the unlikelihood loss is a first unlikelihood loss, the method may further include generating a third text sample by removing the portion associated with the main keyword from the first text sample, and calculating a second unlikelihood loss for the summary model using the third text sample, and the summary model is updated based on the likelihood loss, the first unlikelihood loss, and the second unlikelihood loss.

In some embodiments, the generating of the third text sample may include extracting a plurality of sentences from a text sample different from the first text sample, and generating the third text sample by inserting the plurality of sentences into the first text sample from which the portion associated with the main keyword is removed such that an order of the plurality of sentences is maintained.

In some embodiments, the likelihood loss is a first likelihood loss, the second text sample may be generated by replacing a portion of the first text sample with a mask token, the method may further include generating a third text sample by adding the mask token to the first text sample, and calculating a second likelihood loss for the summary model using the third text sample and the first summary sentence, and the summary model may be updated based on the first likelihood loss, the second likelihood loss, and the unlikelihood loss.

In some embodiments, the updating of the summary model may include summing up the likelihood loss and the unlikelihood loss based on pre-assigned weights, and updating the summary model based on the summed loss, and a weight assigned to the likelihood loss may be higher than a weight assigned to the unlikelihood loss.

In some embodiments, the summary model may be a model predicting tokens constituting a summary sentence of an input text sample in an auto-regressive manner, and the method may further include obtaining a text sample for evaluation and a summary sentence for evaluation, the text sample for evaluation being at least partially different from a text sample corresponding to the summary sentence for evaluation, calculating confidence scores for tokens constituting the summary sentence for evaluation by inputting the text sample for evaluation to the summary model, and evaluating performance of the summary model based on the calculated confidence scores.

In some embodiments, the summary model may be a model predicting tokens constituting a summary sentence of an input text sample in an auto-regressive manner, and the method may further include obtaining a text sample for evaluation and a summary sentence for evaluation, predicting a plurality of tokens by inputting the text sample for evaluation to the summary model and performing decoding through a teacher forcing technique, the teacher forcing technique being performed in a manner of providing the summary sentence for evaluation to the summary model, and evaluating performance of the summary model by comparing a first saliency of the summary model for the input text sample for evaluation appearing in a process of predicting the plurality of tokens and a second saliency for the provided summary sentence for evaluation with each other.

In some embodiments, the first saliency may be calculated based on gradient values for tokens of the text sample for evaluation obtained by back-propagating prediction losses of the plurality of tokens.

In some embodiments, the summary model may be a model predicting tokens constituting a summary sentence of an input text sample in an auto-regressive manner, and the method may further include obtaining a text sample for evaluation and a summary sentence for evaluation, the text sample for evaluation being at least partially different from a text sample corresponding to the summary sentence for evaluation, calculating a confidence score for each token by inputting the text sample for evaluation to the summary model and performing decoding through a teacher forcing technique, the teacher forcing technique being performed in a manner of providing the summary sentence for evaluation to the summary model, and evaluating performance of the summary model based on an entropy value for the confidence score for each token.

In some embodiments, the entropy value is a first entropy value, and the evaluating of the performance of the summary model may include calculating a second entropy value for the text sample corresponding to the summary sentence for evaluation by inputting the text sample corresponding to the summary sentence for evaluation into the summary model and performing decoding through the teacher forcing technique, and evaluating the performance of the summary model based on a difference between the first entropy value and the second entropy value.

According to other embodiments of the disclosure, there is provided a system for generating a summary. The system may include one or more processors, and a memory storing one or more instructions, wherein the one or more processors, by executing the stored one or more instructions, perform operations including calculating a likelihood loss for a summary model using a first text sample and a first summary sentence corresponding to the first text sample, calculating an unlikelihood loss for the summary model using a second text sample and the first summary sentence, the second text sample being a negative sample generated from the first text sample, and updating the summary model based on the likelihood loss and the unlikelihood loss.

According to yet other embodiments of the disclosure, there is provided a non-transitory computer-readable recording medium storing a computer program, which, when executed by at least one processor, causes the at least one processor to perform: including calculating a likelihood loss for a summary model using a first text sample and a first summary sentence corresponding to the first text sample, calculating an unlikelihood loss for the summary model using a second text sample and the first summary sentence, the second text sample being a negative sample generated from the first text sample, and updating the summary model based on the likelihood loss and the unlikelihood loss.

BRIEF DESCRIPTION OF THE DRAWINGS

The above and other aspects and features of the disclosure will become more apparent by describing in detail example embodiments thereof with reference to the attached drawings, in which.

DETAILED DESCRIPTION

Figure 1:
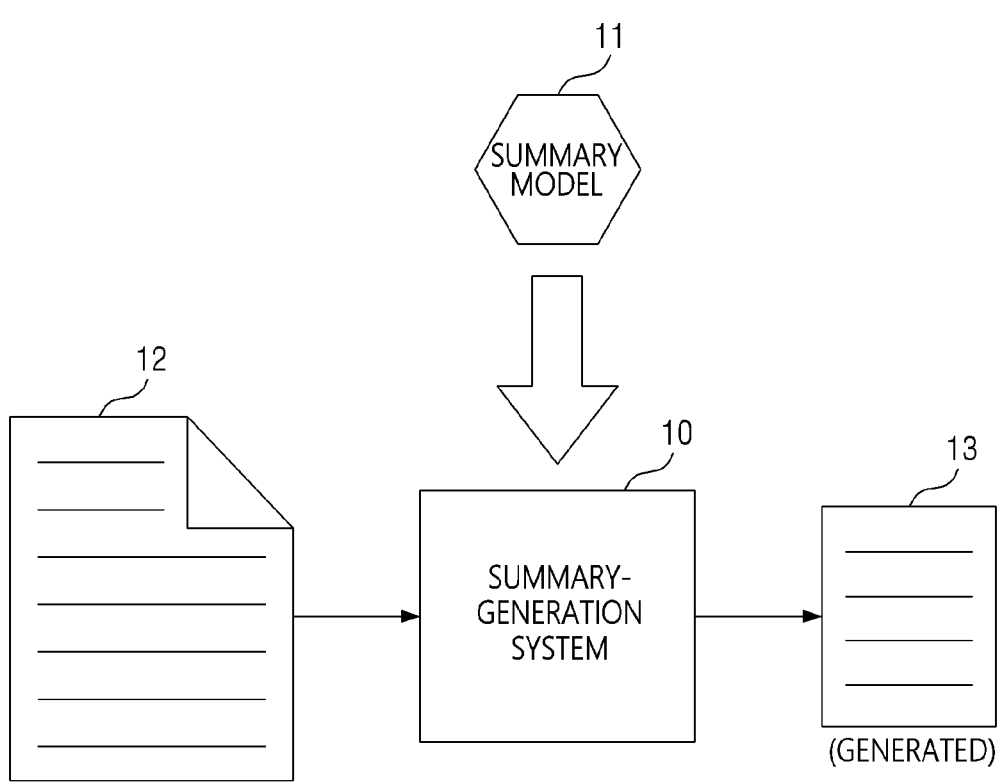
FIG. 1 is an illustrative diagram for schematically describing an operation of a system for generating a summary according to some example embodiments of the disclosure.

Hereinafter, example embodiments of the disclosure will be described with reference to the attached drawings. Advantages and features of the disclosure and methods of accomplishing the same may be understood more readily by reference to the following detailed description of example embodiments and the accompanying drawings. The disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the disclosure will be defined by the appended claims and their equivalents.

In adding reference numerals to the components of each drawing, it should be noted that the same reference numerals are assigned to the same components as much as possible even though they are shown in different drawings. In addition, in describing the disclosure, when it is determined that the detailed description of the related well-known configuration or function may obscure the gist of the disclosure, the detailed description thereof will be omitted.

Unless otherwise defined, all terms used in the present specification (including technical and scientific terms) may be used in a sense that may be commonly understood by those skilled in the art. In addition, the terms defined in commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, various example embodiments of the disclosure will be described in detail with reference to the accompanying drawings.

FIG. 1 is an illustrative diagram for schematically describing an operation of a system 10 for generating a summary according to some example embodiments of the disclosure.

As illustrated in FIG. 1, the system 10 for generating a summary is a computing device/system capable of generating a summary sentence 13 (i.e., a summary text) for an original text 12 (e.g., a document) input through a summary model 11. Hereinafter, for convenience of explanation, the system 10 for generating a summary will be abbreviated as a 'generating system 10'.

Specifically, the generating system 10 may train the summary model 11 using a training dataset composed of text samples and a summary sentence (e.g., a correct answer summary sentence). Here, the 'sample' may refer to unit/individual data input to a deep learning model (e.g., 11), and may be used interchangeably with terms such as an example, an instance, an observation, and a record in the art.

Figure 2:
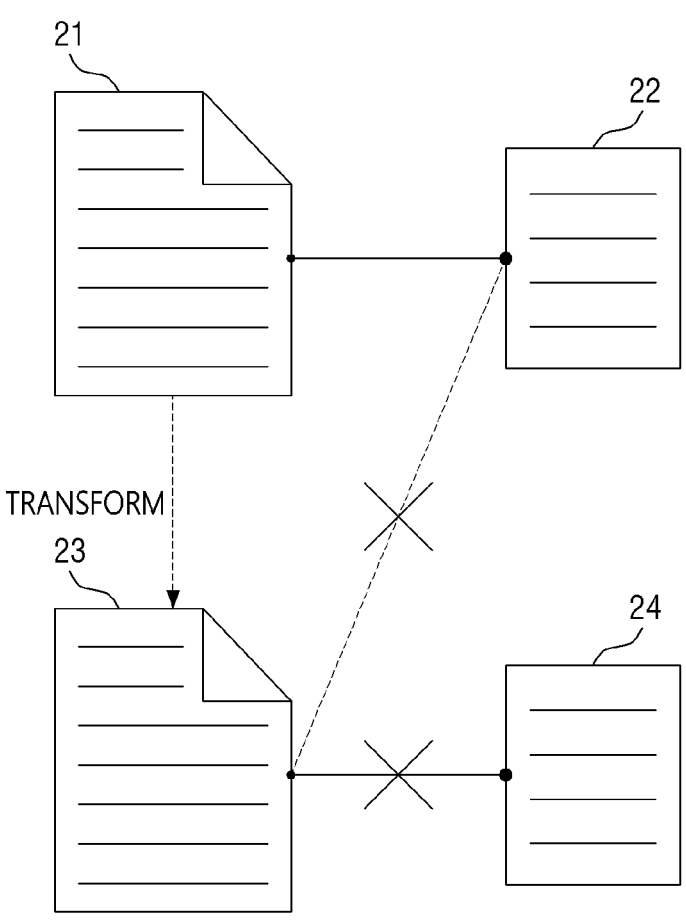
FIG. 2 is an illustrative diagram for describing a data pair for training that may be used by the system for generating a summary according to some example embodiments of the disclosure.

In some example embodiments, the generating system 10 may perform likelihood-based (or likeliness-based) training and unlikehood-based (or unlikeliness-based) training on the summary model 11. Here, the unlikelihood-based training may refer to training performed in a direction of decreasing a likelihood. Specifically, as illustrated in FIG. 2, the generating system 10 may perform the likelihood-based training on the summary model using a first text sample 21 and a summary sentence 22 that correspond to each other (or have high relevance), and perform the unlikelihood-based training using a second text sample 23 and summary sentences 22 and 24 that do not correspond to each other (or have low relevance) (see marks 'X'). In this case, the second text sample 23 may or may not be a sample generated by transforming (e.g., negative-transforming for masking main keywords) the first text sample 21. According to the present example embodiment, the summary model 11 may be inhibited from changing main contents of the original text 12 or generating new contents through the unlikelihood-based training. For example, the summary model 11 may be inhibited from changing main keywords representing a factual relationship in the original text 12, and accordingly, quality of the generated summary sentence 13 may be significantly improved. The present example embodiment will be described in detail later with reference to FIG. 3 and the drawings after FIG. 3.

In addition, the generating system 10 may evaluate performance of the trained summary model 11 using an evaluation dataset. For example, the generating system 10 may evaluate the performance of the summary model 11 related to factual consistency based on predefined metrics, which will be described in more detail later with reference to FIGS. 13 to 15.

For reference, the factual consistency refers to a degree to which a factual relationship of the summary sentence 13 coincides with the original text 12, and it may be expressed (evaluated) that the higher the degree to which keywords of the summary sentence 13 representing the factual relationship coincide with the original text 12, the higher the factual consistency of the summary sentence 13 with respect to the original text 12 (the higher the factual consistency of the factual consistency). A concept of the factual consistency has been already known well by one of ordinary skill in the art, and a detailed description thereof will thus be omitted.

Additionally, the generating system 10 may perform a summary task using the trained summary model 11. For example, the generating system 10 may generate the summary sentence 13 for the original text 12 in which a correct answer (i.e., a correct answer summary sentence or label) does not exist using the trained summary model 11. In some cases, the generating system 10 may provide the trained summary model 11 to a separate task performing device (not illustrated). In such a case, the summary task may be performed by the task performing device (not illustrated).

In some example embodiments, the generating system 10 may provide a summary service to a plurality of users. For example, the generating system 10 may receive a summary request together with a specific text from a user (or a user terminal), and generate and provide a summary sentence of the received text in response to the summary request. In the present example embodiment, the generating system 10 may provide the summary service through a web interface, but the scope of the disclosure is not limited thereto.

The generating system 10 described above may be implemented as at least one computing device. For example, all functions of the generating system 10 may be implemented in one computing device. Alternatively, a first function of the generating system 10 may be implemented in a first computing device and a second function of the generating system 10 may be implemented in a second computing device. Alternatively, specific functions of the generating system 10 may be implemented in a plurality of computing devices.

Figure 16:
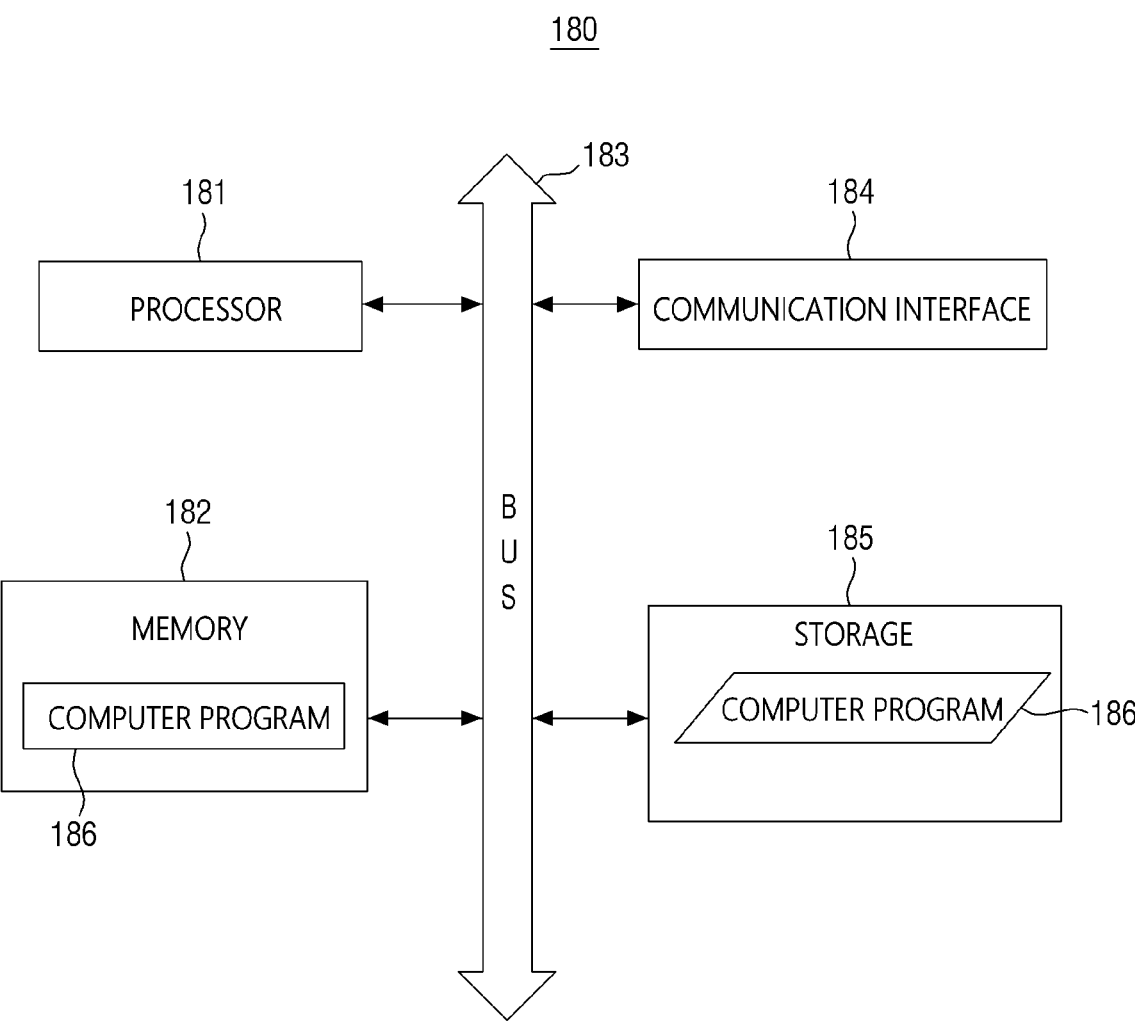
FIG. 16 is a diagram illustrating an illustrative computing device capable of implementing the system for generating a summary according to some example embodiments of the disclosure.

The computing device may include any device having a computing function, and reference is made to FIG. 16 for an example of such a device. The computing device is an aggregate in which various components (e.g., a memory, a processor, etc.) interact with each other, and may thus be referred to as a 'computing system' in some cases. In addition, the computing system may refer to an aggregate in which a plurality of computing devices interact with each other.

So far, the operation of the generating system 10 according to some example embodiments of the disclosure has been schematically described with reference to FIGS. 1 and 2. Hereinafter, various methods that may be performed in the generating system 10 described above will be described in detail with reference to FIG. 3 and the drawings after FIG. 3.

Hereinafter, in order to provide convenience of understanding, a description will be provided on the assumption that all steps/operations of methods to be described later are performed in the generating system 10 described above. Accordingly, when a subject of a specific step/operation is omitted, it may be understood that the specific step/operation is performed in the generating system 10 even though not separately mentioned. However, in a real environment, some steps/operations of methods to be described later may be performed in another computing device.

Figure 3:
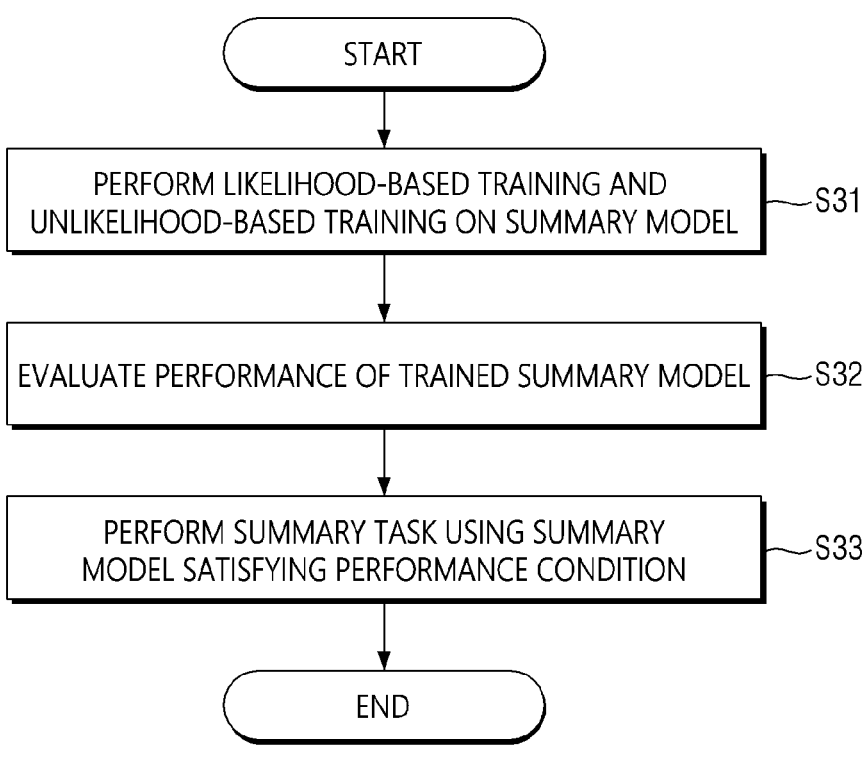
FIG. 3 is an illustrative flowchart schematically illustrating a method for generating a summary according to some example embodiments of the disclosure.

FIG. 3 is an illustrative flowchart schematically illustrating a method for generating a summary according to some example embodiments of the disclosure. However, this is only an example embodiment for achieving an object of the disclosure, and some steps may be added or deleted, if necessary.

As illustrated in FIG. 3, the method for generating a summary according to the present example embodiment may start in step S31 of performing likelihood-based training and unlikelihood-based training on a summary model. For example, the generating system 10 may perform the likelihood-based training using a text sample and a summary sentence that correspond to each other (or have high relevance), and perform the unlikelihood-based training using a text sample and a summary sentence that do not correspond to each other (or have low relevance). A specific training method of the present step will be described in detail later with reference to FIG. 4 and the drawings after FIG. 4.

In step S32, performance of the trained summary model may be evaluated. For example, the generating system 10 may evaluate the performance of the summary model related to factual consistency using predetermined metrics. This will be described in detail later with reference to FIGS. 13 to 15. Alternatively, the generating system 10 may evaluate the performance of the summary model using other metrics.

In step S33, a summary task may be performed using a summary model satisfying a performance condition (e.g., a summary model of which evaluated performance is a reference value or more). For example, the generating system 10 may perform a summary task or provide a summary service to a user, using a summary model satisfying a performance condition related to the factual consistency.

So far, the method for generating a summary according to some example embodiments of the disclosure has been schematically described with reference to FIG. 3. Hereinafter, a method for training a summary model according to some example embodiments of the disclosure will be described with reference to FIGS. 4 to 11.

First, in order to provide more convenience of understanding, an illustrative summary model will be briefly described with reference to FIG. 4.

Figure 4:
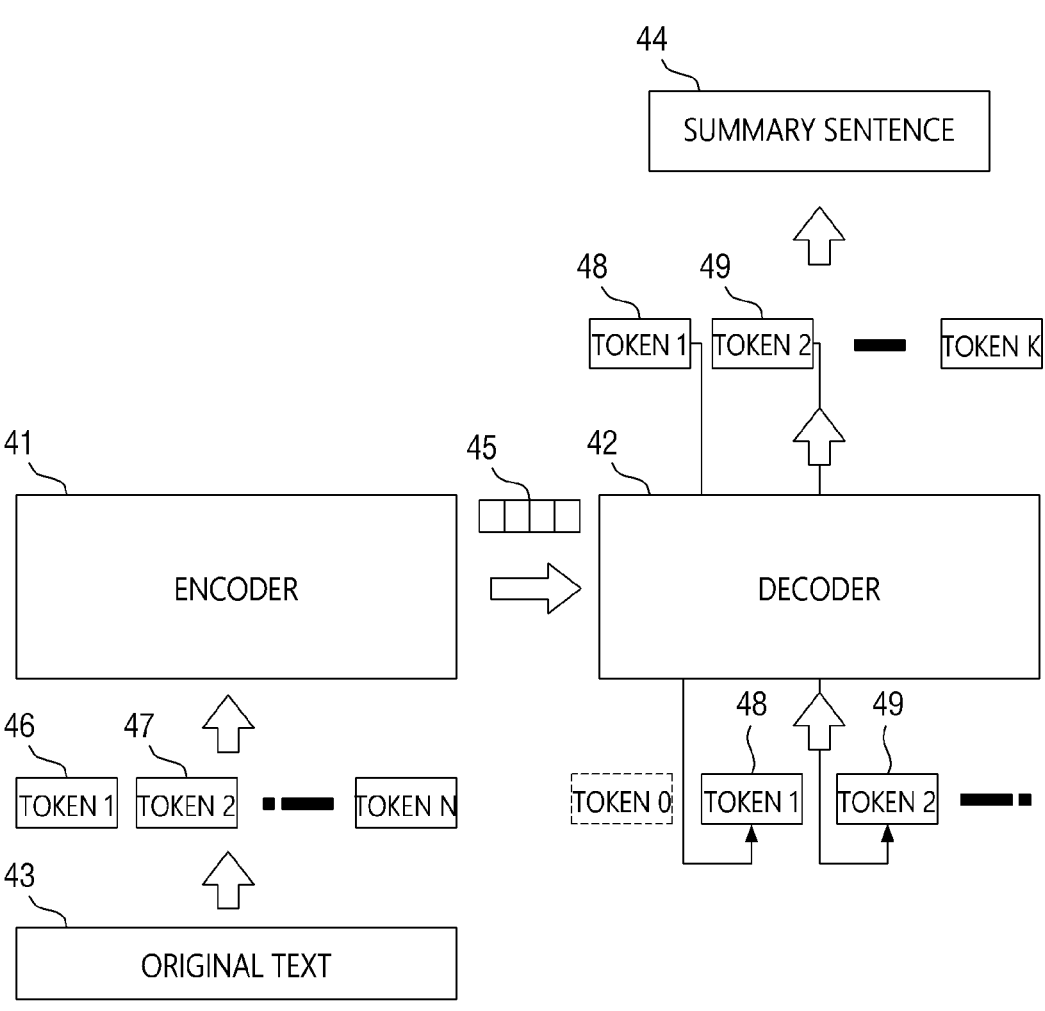
FIGS. 4 and 5 are illustrative diagrams for describing a structure and an operation of an illustrative summary model that may be referenced in some example embodiments of the disclosure.

FIG. 4 is an illustrative diagram for describing a structure and an operation of an illustrative summary model that may be referenced in some example embodiments of the disclosure.

As illustrated in FIG. 4, the illustrative summary model may be a deep learning model that receives an original text 43 and generates (outputs) a summary sentence 44, and may be configured to include an encoder 41 and a decoder 42.

The encoder 41 may encode the original text 43. For example, as illustrated in FIG. 4, the encoder 41 may receive a sequence of a plurality of tokens (e.g., 46 and 47) constituting the original text 43 and generate an encoding vector 45 for the original text 43 through an appropriate encoding operation. In this case, the respective tokens may be input to the encoder 41 in the form of a one-hot vector or in the form of an embedding vector. In the former case, the encoder 41 may include an embedding layer (e.g., a multi-layer perceptron) converting the one-hot vector of each token into an embedding vector.

The encoding vector 45 may be, for example, a context vector in which all information of the original text 43 is included or an encoding (or embedding) vector in units of tokens (or sentences), and may be variously modified depending on a design manner of a model.

The encoder 41 may be implemented as a neural network. For example, the encoder 41 may be implemented as a recurrent neural network (RNN)-based neural network or an attention-based neural network (e.g., a transformer encoder). However, the scope of the disclosure is not limited thereto.

Next, the decoder 42 may decode the encoding vector 45 and output (generate) the summary sentence 44. For example, as illustrated in FIG. 4, the decoder 42 may generate the summary sentence 44 by repeatedly performing a decoding step (operation) in an auto-regressive manner (e.g., performing a decoding step (operation) until a token indicating the end of summary sentence 44 is output). That is, the decoder 42 may decode an output result (e.g., a token 48) of the previous step and the encoding vector 45 together and output (predict) a result (e.g., a token 49) of a current decoding step. However, the scope of the disclosure is not limited thereto. A decoding (prediction) manner of the auto-regressive manner has been already known well by one of ordinary skill in the art, and a detailed description thereof will thus be omitted.

Figure 5:
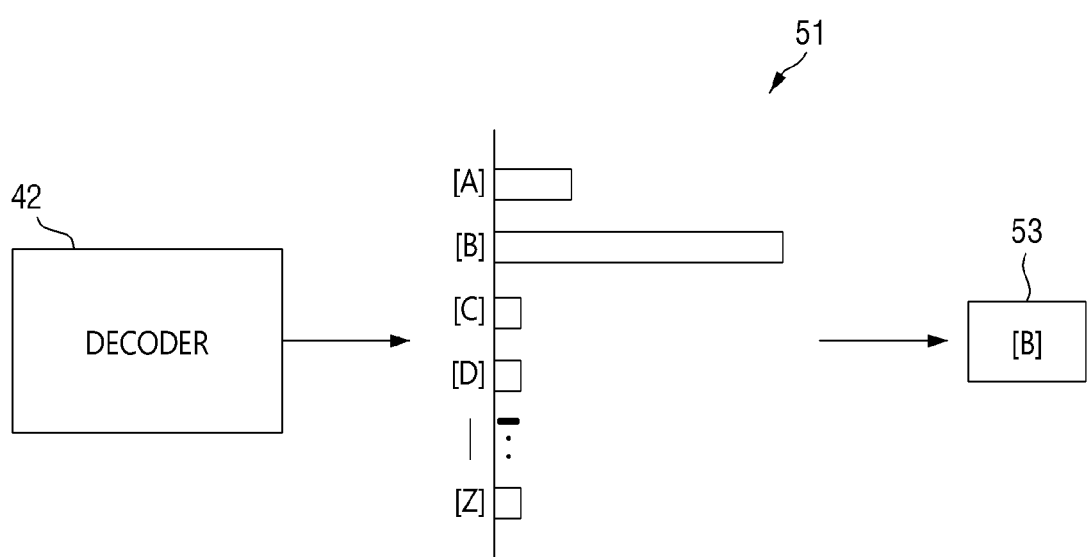

In more detail, in each decoding step, as illustrated in FIG. 5, the decoder 42 may calculate (output) confidence scores 51 for a plurality of tokens (i.e., tokens pre-defined in a token dictionary). In addition, a token 53 (e.g., token B) having the highest confidence score may be output as a result of the corresponding decoding step.

For reference, a square bracket (Jr) in FIG. 5 and the drawings after FIG. 5 refers to a token. For example, '[A] ' illustrated in FIG. 5 may be understood to refer to a 'token A' and '[Z]' illustrated in FIG. 5 may be understood to refer to a 'token Z'.

The decoder 42 may also be implemented as a neural network. For example, the decoder 42 may be implemented as an RNN-based neural network or an attention-based neural network (e.g., a transformer decoder). However, the scope of the disclosure is not limited thereto.

So far, the illustrated summary model that may be referenced in some example embodiments of the disclosure has been briefly described with reference to FIGS. 4 and 5. Hereinafter, a method for training a summary model according to some example embodiments of the disclosure will be described with reference to FIGS. 6 to 11, and in order to provide convenience of understanding, a description will be provided on the assumption that the summary model is configured in the structure illustrated in FIG. 4.

Figure 6:
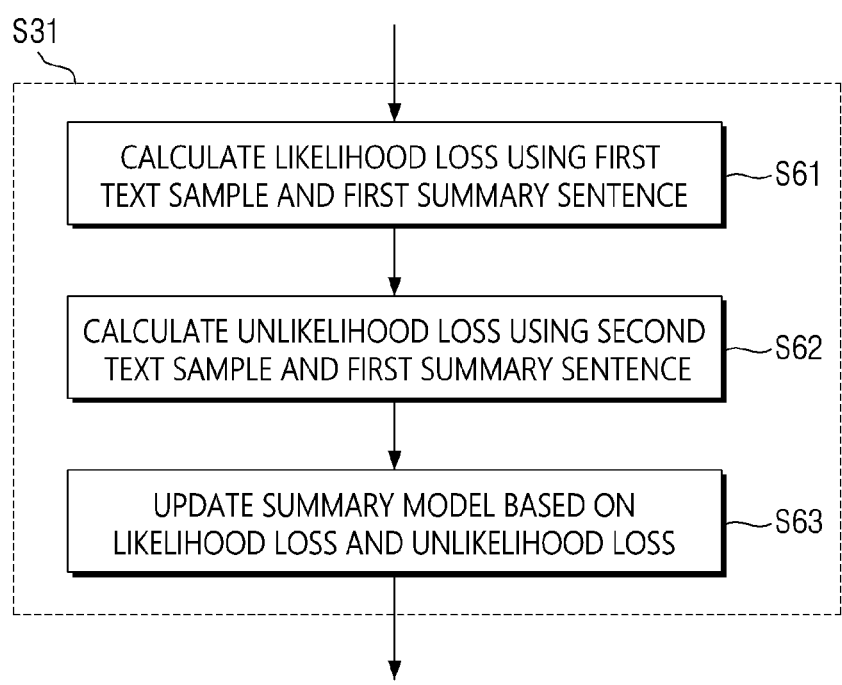
FIG. 6 is an illustrative flowchart illustrating a method for training a summary model according to some example embodiments of the disclosure.

FIG. 6 is an illustrative flowchart illustrating a method for training a summary model according to some example embodiments of the disclosure. However, this is only an example embodiment for achieving an object of the disclosure, and some steps may be added or deleted, if necessary.

As illustrated in FIG. 6, the method for training a summary model according to the present example embodiment may start in step S61 of calculating a likelihood loss for a summary model using a first text sample and a first summary sentence. Here, the first text sample and the first summary sentence may refer to a data pair that corresponds to each other (or has high relevance). For example, it may be understood that the first text sample is a kind of 'positive sample' with respect to the first summary sentence, and the first summary sentence is a kind of 'positive label' with respect to the first text sample.

For reference, the first text sample may be an original text sample or a positive sample generated by transforming (i.e., positively transforming) the original text sample. However, hereinafter, for convenience of understanding, a description will be provided on the assumption that the first text sample is an original text sample and the first summary sentence is a summary sentence corresponding to the original text sample. The original text sample may be used to generate a positive sample or a negative sample, and thus, may also be referred to as an 'anchor sample' in some cases.

In the present step S61, the generating system 10 may generate a summary sentence by inputting the first text sample to the summary model, and calculate a likelihood loss based on a difference between the generated summary sentence and the first summary sentence. The likelihood loss refers to a loss calculated for likelihood-based training (i.e., training performed in a direction of increasing a likelihood), and may be calculated based on, for example, a cross-entropy. However, the scope of the disclosure is not limited thereto. For example, the generating system 10 may calculate a cross-entropy loss between a prediction result (i.e., a confidence score for each token) in each decoding step of the summary model and a correct answer (i.e., a correct answer token) according to the first summary sentence, and the calculated cross-entropy loss may be used as the likelihood loss. The reason why the cross-entropy loss may be used as the likelihood loss is that a probability (i.e., a likelihood) that the first summary sentence will be generated from the first text sample increases as a weight parameter of the summary model is updated based on the cross-entropy loss. Such technical contents are obvious to one of ordinary skill in the art, and a further description thereof will thus be omitted.

In step S62, an unlikelihood loss may be calculated using a second text sample and the first summary sentence. Here, the second text sample and the first summary sentence may refer to a data pair that does not correspond to each other (or has low relevance). For example, it may be understood that the second text sample is a kind of 'negative sample' with respect to the first summary sentence, and the first summary sentence is a kind of 'negative label' with respect to the second text sample.

For reference, the second text sample may or may not be a sample generated by transforming (i.e., negatively transforming) the first text sample. However, hereinafter, for convenience of understanding, a description will be provided on the assumption that the second text sample is a negative sample generated from the first text sample (i.e., the original text sample).

In the present step S62, the generating system 10 may generate a summary sentence by inputting the second text sample to the summary model, and calculate an unlikelihood loss based on a difference between the generated summary sentence and the first summary sentence. The unlikelihood loss refers to a loss calculated for unlikelihood-based training (i.e., training performed in a direction of decreasing a likelihood), and may also be calculated based on, for example, a cross-entropy. However, the scope of the disclosure is not limited thereto. For example, the generating system 10 may calculate a cross-entropy loss between a prediction result (i.e., a confidence score for each token) in each decoding step of the summary model and a correct answer (i.e., a correct answer token) according to the first summary sentence, and the unlikelihood loss may be calculated as a value that decreases as the cross-entropy loss increases.

Meanwhile, a specific manner of generating the second text sample (i.e., the negative sample) may be changed according to example embodiments.

Figure 7:
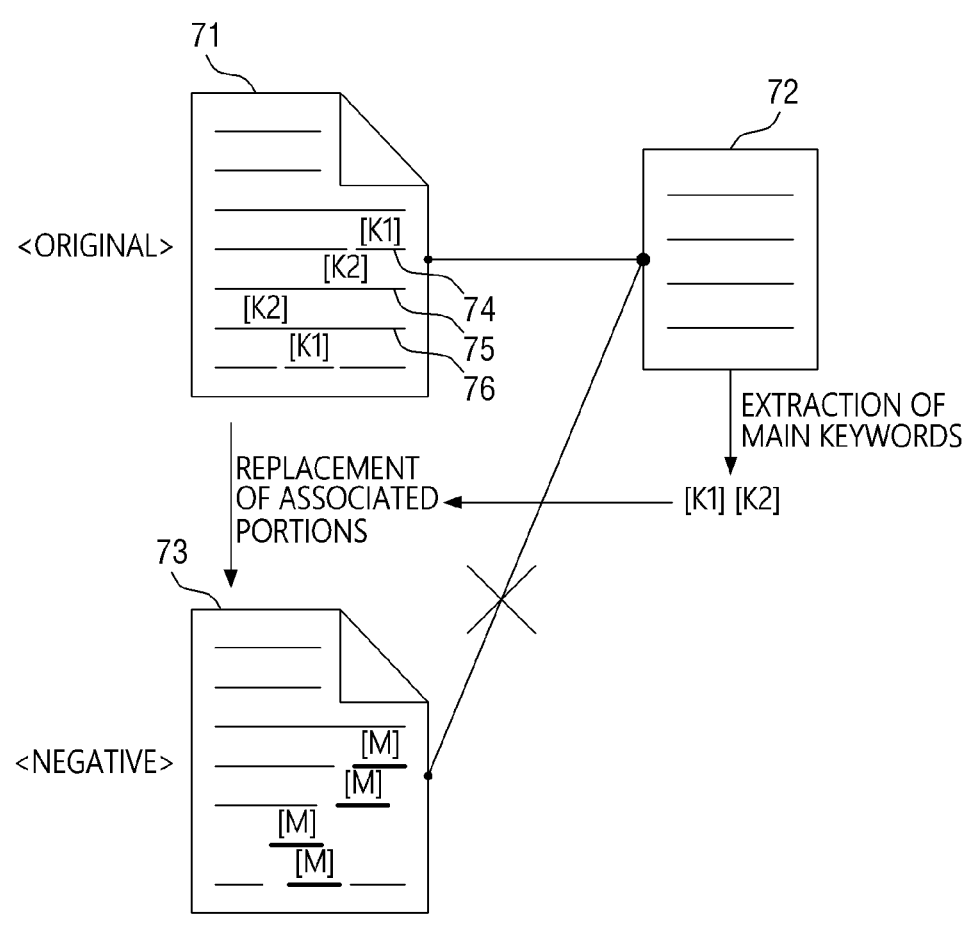
FIG. 7 is an illustrative diagram for describing a method for generating a negative sample according to some example embodiments of the disclosure.

In some example embodiments, as illustrated in FIG. 7, a second text sample 73 may be generated by extracting main keywords (e.g., K1 and K2) from a first summary sentence 72 and masking portions associated with the main keywords (i.e., replacing the portions associated with the main keywords with mast tokens) in a first text sample 71. Here, the portion associated with the main keyword may be, for example, a token (see 74) exactly matching the main keyword, a token group (see 75) including a matching token (i.e., a token exactly matching the main keyword) and adjacent tokens, a sentence (see 76) or a paragraph including the matching token, or the like, but the scope of the disclosure is not limited thereto. For example, the generating system 10 may generate the second text sample by replacing the matching token with a mask token (see [M]) or generate the second text sample by replacing the sentence including the matching token with the mask token. Alternatively, the generating system 10 may generate various types of negative samples (e.g., a plurality of negative samples having different masking ranges, etc.) by combining the illustrated manners with each other.

Figure 8:
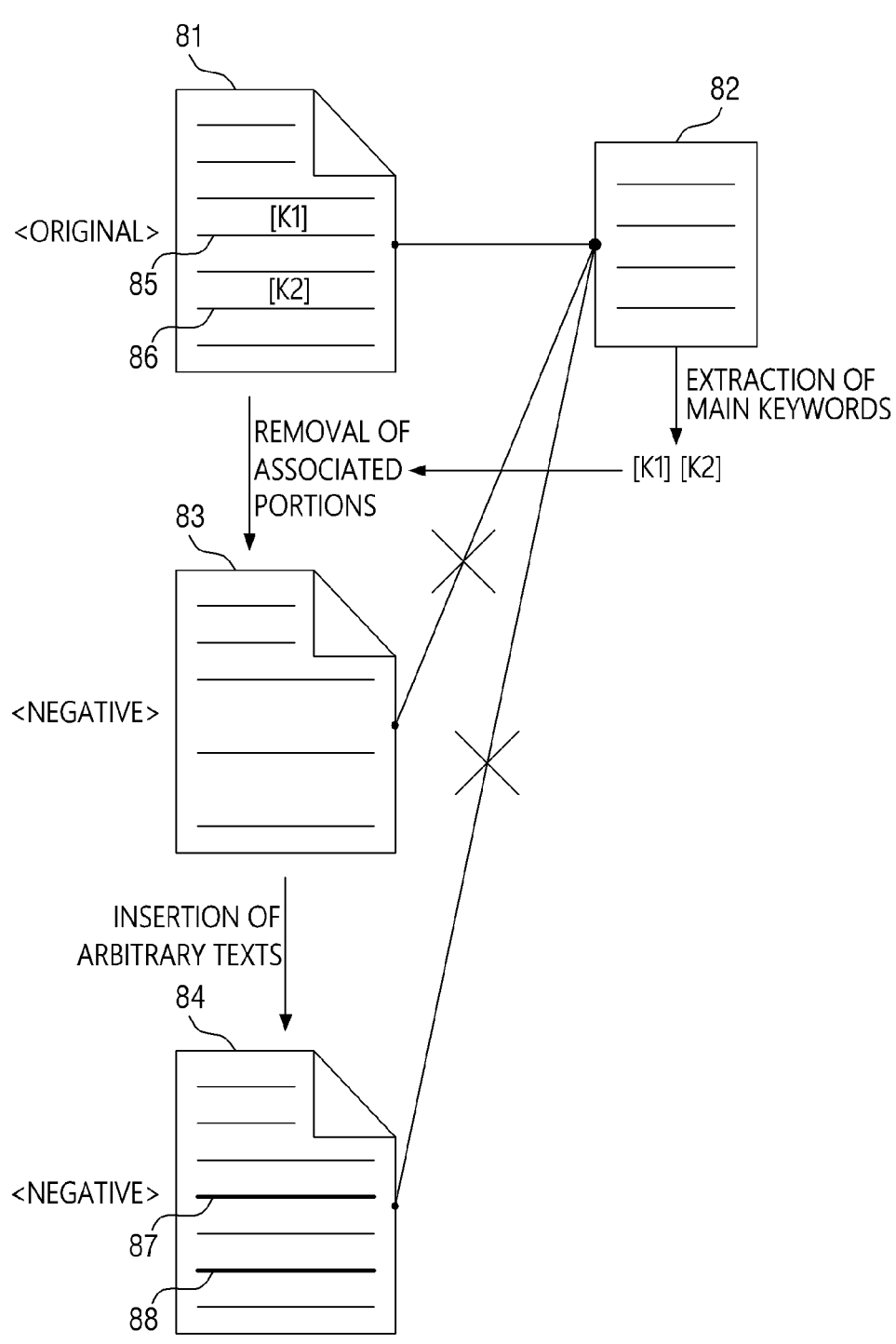
FIG. 8 is an illustrative diagram for describing a method for generating a negative sample according to some other example embodiments of the disclosure.

In some other example embodiments, as illustrated in FIG. 8, a negative sample 83 may be generated by extracting main keywords (e.g., K1 and K2) from a first summary sentence 82 and removing portions associated with the main keywords in a first text sample 81. Here, the portion associated with the main keyword may be a matching token, a token group (i.e., a token group including the matching token), a sentence, a paragraph, or the like, but the scope of the disclosure is not limited thereto. In the present example embodiment, a second text sample may be the negative sample 83 or may be a sample generated by adding arbitrary texts to the negative sample 83. For example, the generating system 10 may generate a second text sample 84 by extracting a plurality of sentences (see 87 and 88) from a text sample different from the first text sample 81 and inserting the plurality of sentences (see 87 and 88) into the negative sample 83 so that the order of the plurality of sentences is maintained (i.e., an original order relationship between the plurality of sentences is maintained). In such a case, a contextually natural (i.e., higher-quality) negative sample may be generated.

In some other example embodiments, the second text sample (or the plurality of negative samples) may be generated based on various combinations of the previous example embodiments. For example, the generating system 10 may generate a first negative sample that includes the mask token according to the manner illustrated in FIG. 7 and a second negative sample that does not include the mask token according to the manner illustrated in FIG. 8. In this case, the second negative sample may serve to improve an effect of training by preventing the summary model from using whether or not the mask token appears as a criterion for training.

Meanwhile, a manner of extracting main keywords may also be changed according to example embodiments.

In some example embodiments, words of specific parts of speech may be extracted as the main keywords based on a result of part-of-speech analysis for the first summary sentence. For example, the generating system 10 may extract words having parts of speech such as nouns (e.g., proper nouns), verbs, adjectives, and numerals as the main keywords. The reason is that the words having such parts of speech are mainly words representing a factual relationship. In more detail, if the summary model changes the name of a person (or thing), a date, and the like, when it generates the summary sentence, a factual relationship between the original text and the summary sentence is significantly changed, such that quality of the summary sentence may not but be deteriorated. Accordingly, it may be understood that words having parts of speech such as a proper noun and a numeral are extracted as the main keywords through part-of-speech analysis and unlikelihood-based training is performed using a negative sample in which such main keywords are masked (or removed).

In some other example embodiments, the main keywords may be extracted based on a result of named entity recognition for the first summary sentence. For example, the generating system 10 may perform named entity recognition on the first summary sentence and extract words belonging to a designated named entity category as the main keywords.

In some other example embodiments, the main keywords may be extracted using a predefined keyword (token) dictionary. For example, main keywords that may deteriorate factual consistency of the summary sentence may be predefined in the form of a dictionary, and the generating system 10 may extract the main keywords from the first summary sentence using the corresponding dictionary.

In some other example embodiments, the main keywords may be extracted based on various combinations of the previous example embodiments.

Figure 9:
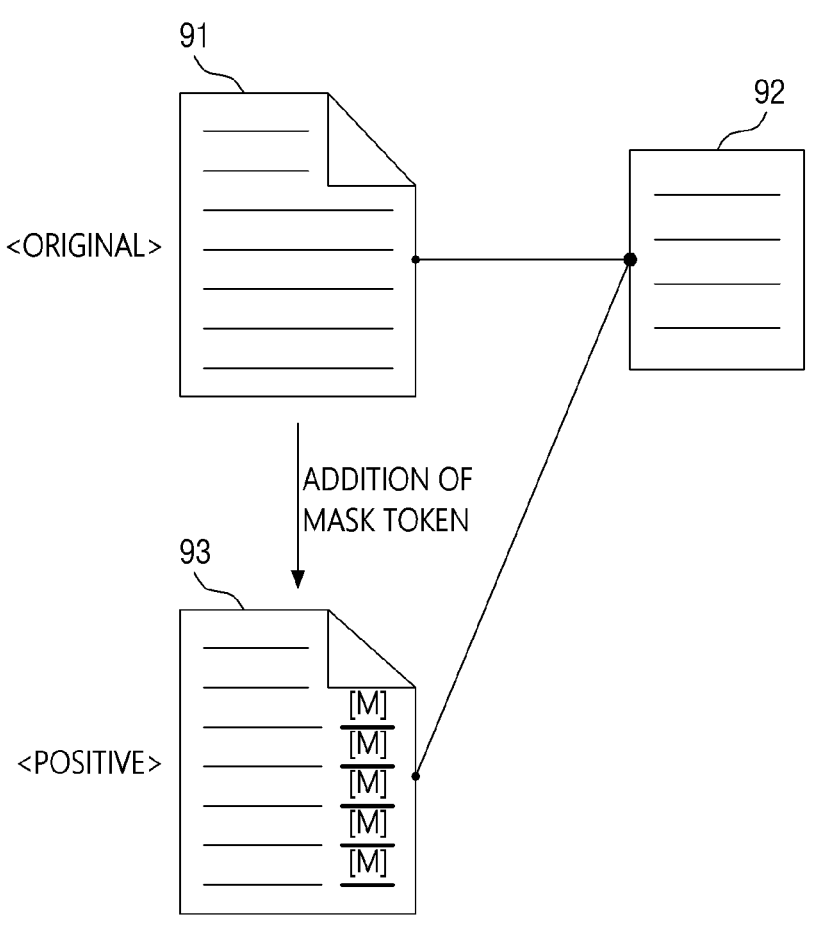
FIG. 9 is an illustrative diagram for describing a method for generating a positive sample according to some other example embodiments of the disclosure.

Meanwhile, according to some example embodiments of the disclosure, a positive sample generated by adding the mask token to the first text sample may be further used for likelihood-based training. For example, as illustrated in FIG. 9, the generating system 10 may generate a positive sample 93 by adding the mask token to a first text sample 91. For example, the generating system 10 may generate the positive sample 93 by extracting at least one sentence from a text sample different from the first text sample 91, replacing a portion or the entirety of the extracted sentence with the mask token, and inserting the sentence of which the portion or the entirety is replaced with the mask token into the first text sample 91. The positive sample 93 may also serve to improve an effect of training by preventing the summary model from using whether or not the mask token appears as a criterion for training. In the present example embodiment, the generating system 10 may further calculate a likelihood loss using the positive sample 93 and a first summary sentence 92, and update the summary model based on the calculated likelihood loss.

In addition, according to some example embodiments, the unlikelihood loss may also be calculated only for the main keywords of the first summary sentence (e.g., 72 or 82). For example, the generating system 10 may also calculate the unlikelihood loss based only on the cross-entropy loss in decoding steps for the main keywords of the first summary sentence among a plurality of decoding steps. In such a case, an effect of imposing a penalty only when the summary model changes the main keywords is achieved, and thus, the unlikelihood-based training on the summary model may be performed more elaborately.

A description will be provided with reference to FIG. 6 again.

Figure 10:
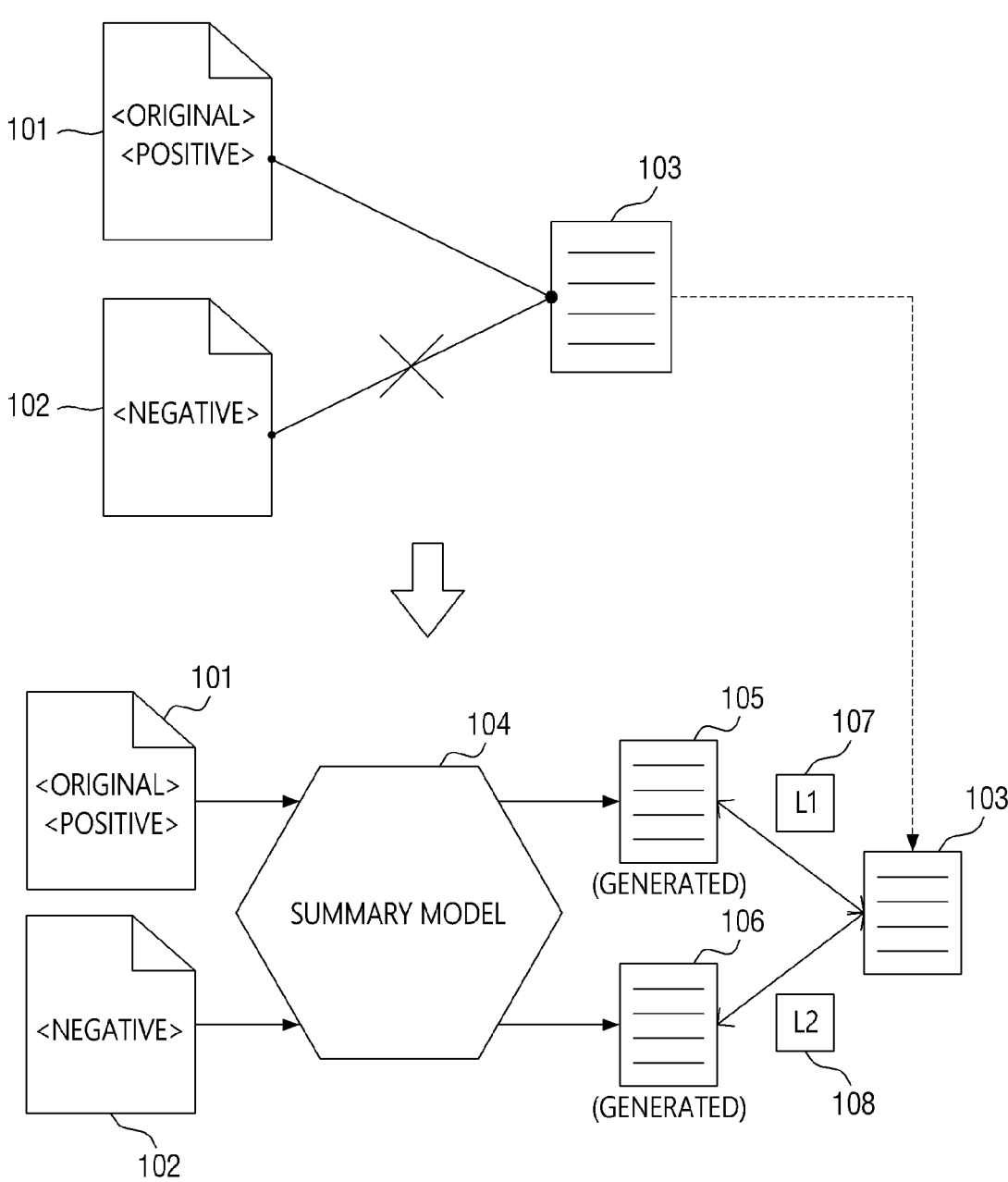
FIG. 10 is an illustrative diagram illustrating a process of training a summary model according to some example embodiments of the disclosure.

In step S63, the summary model may be updated based on the likelihood loss and the unlikelihood loss. For example, as illustrated in FIG. 10, the generating system 10 may calculate a likelihood loss 107 using a first text sample 101 (e.g., an original text sample, a positive sample generated from the original text sample, etc.) and a first summary sentence 103 (e.g., calculate the likelihood loss 107 based on a difference between a generated summary sentence 105 and the first summary sentence 103, the difference may mean a difference between the confidence score for each token output from summary model 104 in relation to the generated summary sentence 105 and the first summary sentence 103), and calculate an unlikelihood loss 108 using a second text sample 102 (e.g., a negative sample generated from the original text sample, etc.) and the first summary sentence 103 (e.g., calculate the unlikelihood loss 108 based on a difference between the generated summary sentence 106 and the first summary sentence 103, the difference may mean a difference between the confidence score for each token output in summary model 104 in relation to the generated summary sentence 106 and the first summary sentence 103). In addition, the generating system 10 may update weight parameters of a summary model 104 based on the likelihood loss and the unlikelihood loss.

As a more specific example, the generating system 10 may calculate a total loss by summing up the likelihood loss and the unlikelihood loss based on pre-assigned weights, and may update the weight parameters of the summary model by back-propagating the total loss. In this case, a weight assigned to the likelihood loss may be higher than a weight assigned to the unlikelihood loss. That is, the likelihood loss may be used as a main loss and the unlikelihood loss may be used as an auxiliary loss. This is because general summary performance of the summary model is more dependent on the likelihood-based training. However, in some cases, a higher weight may be assigned to the unlikelihood loss, and as the training is repeatedly performed, the weight assigned to the likelihood loss may be set to decrease and the weight assigned to the unlikelihood loss may be set to increase. A method for updating weight parameters of the deep learning model in a direction in which the loss is reduced through back-propagation has been already known well by one of ordinary skill in the art, and a detailed description thereof will thus be omitted.

The above-described steps S61 to S63 may be repeatedly performed on a plurality of text samples and a summary sentence constituting a training dataset. In this way, the summary model may have the ability to generate a high-quality summary sentence. For example, the likelihood loss (or the likelihood-based training) serves to improve general summarization ability of the summary model, and the unlikelihood loss (or the unlikelihood-based training) serves to inhibit the summary model from changing the main keywords or generating new main keywords, such that a high-performance summary model (e.g., a summary model having high factual consistency) may be built.

Hereinafter, the method for training a summary model described so far will be further described with reference to FIG. 11.

Figure 11:
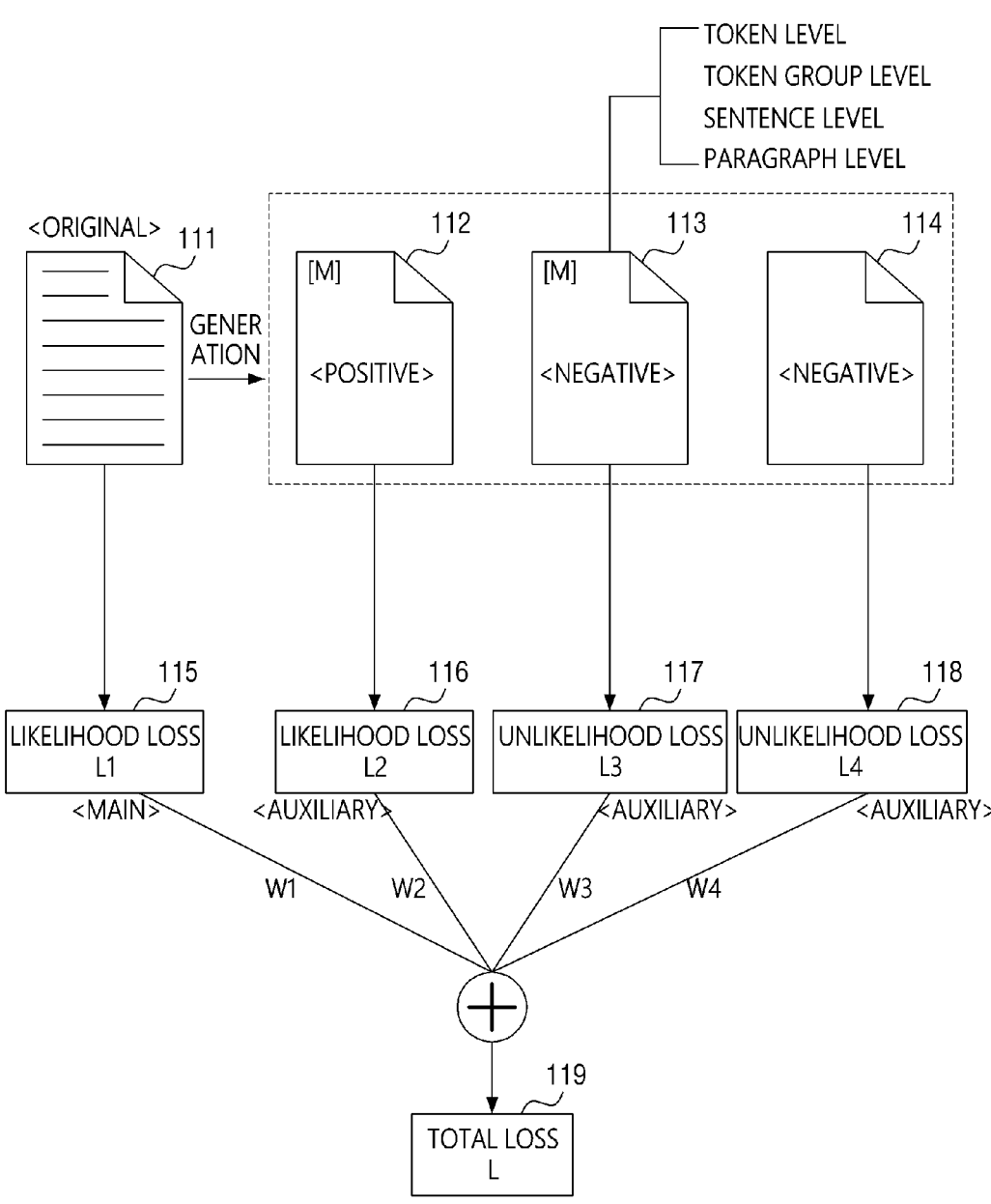
FIG. 11 is an illustrative diagram for further describing the method for training a summary model according to some example embodiments of the disclosure.

FIG. 11 illustrates a more specific example embodiment of the method for training a summary model described above. Also in FIG. 11, '[M]' refers to a mask token, and text samples 112 and 113 including [M] refer to text samples including the mask token.

As illustrated in FIG. 11, when a summary sentence (not illustrated) corresponding (or having high relevance) to an original text sample 111 is given, the generating system 10 may generate the above-described positive sample 112 and negative samples 113 and 114 using the original text sample 111. For example, the generating system 10 may generate all text samples 112 to 114 in each training step or generate only at least one text sample (e.g., 113) based on a predefined probability. In addition, even when the generating system 10 generates the negative sample 113 including the mask token, the generating system 10 may determine a masking range (e.g., a matching token, a token group, a sentence, a paragraph, etc.) based on a predefined probability and generate the negative sample 113 according to the determined masking range. Hereinafter, a description will be provided on the assumption that all text samples 112 to 114 are generated.

Next, the generating system 10 may calculate likelihood losses 115 and 116 and unlikelihood losses 117 and 118 using the respective text samples 111 to 114 and the first summary sentence (not illustrated), and calculate a total loss 119 by summing up the calculated losses based on weights (see W1 to W4). In this case, it would be common that the highest weight W1 is assigned to the likelihood loss 115 obtained from the original text sample 111 (i.e., the likelihood loss 115 is used as the main loss), but the scope of the disclosure is not limited thereto.

When a process of calculating the total loss is expressed as an equation, it may be expressed as, for example, Equation 1. Equation 1 assumes that the total loss is calculated by summing up the likelihood loss 115 and 116 for the original text sample 111 and the positive sample 112 and the unlikelihood loss 117 or 118 for the negative sample 113 or 114.

In Equation 1, Γ refers to the total loss, 'D' refers to the original text sample 111, and 'dist (D)' of a second term refers to the negative sample 113 or 114. In addition, 'dist(D)' of a third term refers to the positive sample 112, 'S' refers to the first summary sentence, and 'n' refers to a position of a token constituting the first summary sentence. In addition, the first term and the third term refer to the likelihood losses 115 and 116, respectively, the second term refers to the unlikelihood loss 117 or 118, and coefficients 'a' and '13' of the second term and the third term refer to weights (e.g., W3 and W2) assigned to the corresponding losses, respectively.

$$\mathcal{L} = \sum_{n=1}^{N} -\log(p(s_n \mid D, s_{<n})) - \qquad \text{[Equation 1]}$$

$$\alpha\log(1 - p(s_n \mid dist(D), s_{<n})) - \mathcal{B} * \log(p(s_n \mid dist(D), s_{<n}))$$

Next, the generating system 10 may update weight parameters of the summary model by back-propagating the total loss 119.

So far, the method for training a summary model according to some example embodiments of the disclosure has been described with reference to FIGS. 6 to 11. According to that described above, a high-performance summary model may be built by performing both the likelihood-based training and the unlikelihood-based training on the summary model. For example, the likelihood-based training may allow the summary model to well generate main contents of the input original text. In addition, the unlikelihood-based training may inhibit the summary model from changing the main contents (e.g., main keywords representing a factual relationship) of the input original text or adding new contents. Accordingly, the performance of the summary model may be significantly improved. For example, the performance of the summary model related to the factual consistency may be dramatically improved.

In addition, when the first text sample and the summary sentence that correspond to each other (or have high relevance) are given, the negative sample used for the unlikelihood-based training may be easily generated by extracting the main keywords from the summary sentence and masking portions related to the main keywords in the first text sample. Furthermore, by variously setting the masking range (e.g., token, token group, sentence, paragraph levels, etc.), various types of negative samples may be easily generated.

In addition, the negative sample may also be generated in a manner of removing the portions related to the main keywords from the first text sample. The negative sample generate as described above may further improve the performance of the summary model by preventing the summary model from using whether or not the mask token appears as a criterion for training.

In addition, the positive sample may be generated in a manner of adding the mask token to the first text sample. The positive sample generate as described above may also further improve the performance of the summary model by preventing the summary model from using whether or not the mask token appears as a criterion for training.

Hereinafter, a method for training a summary model according to some other example embodiments of the disclosure will be described with reference to FIG. 12. However, for clarity of the disclosure, a description of contents overlapping those of the previous example embodiments will be omitted.

Figure 12:
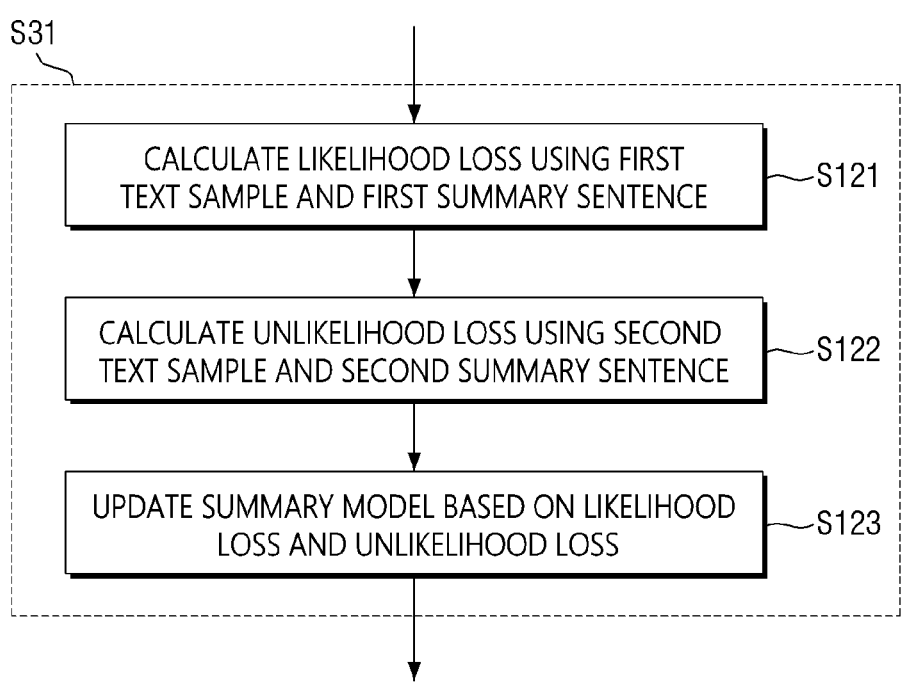
FIG. 12 is an illustrative flowchart illustrating a method for training a summary model according to some other example embodiments of the disclosure.

FIG. 12 is an illustrative flowchart illustrating a method for training a summary model according to some other example embodiments of the disclosure. However, this is only an example embodiment for achieving an object of the disclosure, and some steps may be added or deleted, if necessary.

As illustrated in FIG. 12, the method for training a summary model according to the present example embodiment may start in step S121 of calculating a likelihood loss for a summary model using a first text sample and a first summary sentence. Here, the second text sample and the first summary sentence may refer to a data pair that corresponds to each other (or has high relevance).

In step S122, an unlikelihood loss may be calculated for the summary model using a second text sample and a second summary sentence. Here, the second text sample and the second summary sentence may refer to a data pair that does not correspond to each other (or has low relevance). For example, the relevance between the second text sample and the second summary sentence may be lower than the relevance between the first text sample and the first summary sentence.

The second text sample may be generated from the first text sample or may be an original text sample different from the first text sample. In addition, in some cases, the second text sample may refer to the same text sample as the first text sample.

The second summary sentence may also be generated from the first summary sentence or may be an original summary sentence different from the first summary sentence. For example, the generating system 10 may generate the second summary sentence by changing main keywords in the first summary sentence. For example, the generating system 10 may generate the second summary sentence by changing a proper noun or a numeral in the first summary sentence, and calculate the unlikelihood loss using the second text sample that is the same as the first text sample and the second summary sentence. In some cases, the second summary sentence may refer to the same summary sentence as the first summary sentence.

Meanwhile, the relevance (or a corresponding relationship) between the text sample and the summary sentence may be determined in various manners and may be determined in any manner. For example, the relevance between the text sample and the summary sentence may be designated by a user or be determined based on the number (or the frequency) of main keywords that appear in common between the text sample and the summary sentence, the number (or the frequency) of main keywords that do not appear in common between the text sample and the summary sentence (that is, appear only in any one of the text sample and the summary sentence), and similarity between the text sample and the summary sentence (e.g., document similarity). However, the scope of the disclosure is not limited thereto.

In step S123, the summary model may be updated based on the likelihood loss and the unlikelihood loss. For the present step, reference is made to the description of step S63 described above.

So far, the method for training a summary model according to some other example embodiments of the disclosure has been described with reference to FIG. 12. Hereinafter, a method and metrics capable of evaluating performance of a summary model related to factual consistency will be described with reference to FIGS. 13 to 15.

Figure 13:
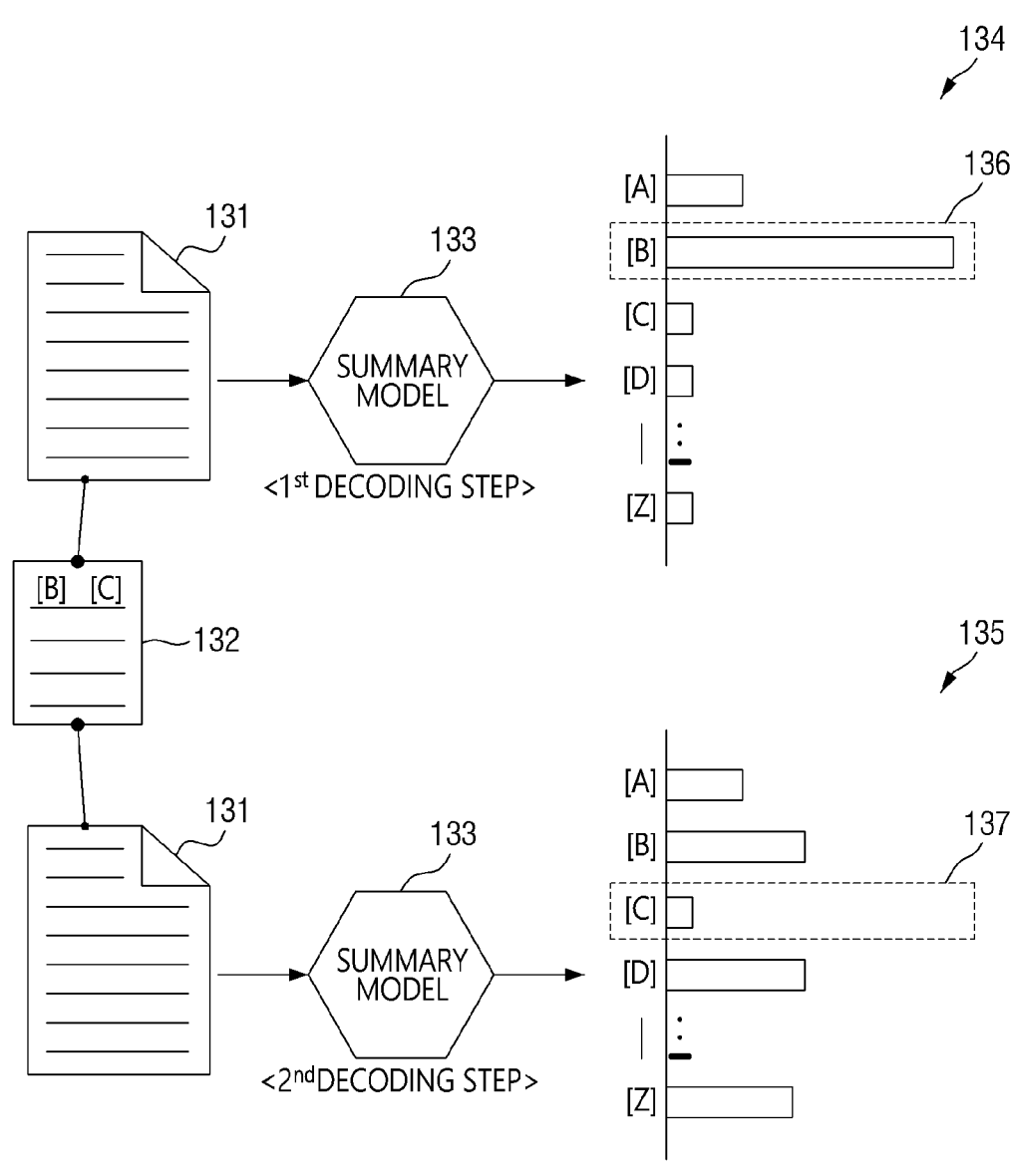
FIG. 13 is an illustrative diagram for describing a method for evaluating performance of a summary model according to some example embodiments of the disclosure.

First, a method for evaluating performance of a summary model according to some example embodiments of the disclosure will be described with reference to FIG. 13.

The present example embodiment relates to a method for evaluating performance of a summary model using a conditional likelihood as an evaluation metric. Here, the conditional likelihood refers to a probability (i.e., a likelihood) that a specific summary sentence will be generated for an input text sample. The reason why the conditional likelihood may be used as an evaluation metric of factual consistency is that a summary model having low factual consistency is highly unlikely to sufficiently decrease the conditional likelihood for a data pair (i.e., a text sample and a summary sentence) having low factual consistency (or relevance), whereas a summary model having high factual consistency is highly likely to sufficiently decrease the conditional likelihood.

The conditional likelihood may be calculated based on, for example, Equation 2. In Equation 2, 'CSL' (conditional summary likelihood) refers to the conditional likelihood, 'D' refers to a text sample for evaluation, and 'Y' refers to a summary sentence for evaluation. In addition, 'n' refers to a position of a token constituting the summary sentence for evaluation, and '$p_n$' refers to a decoding probability (i.e., a confidence score) for an n-th token.

$$CSL = \frac{1}{N}\sum_{n=1}^{N} p_n(Y_n \mid Y_{<n}, D) \qquad \text{[Equation 2]}$$

In the present example embodiment, the generating system 10 may calculate the conditional likelihood of the summary model for the text sample for evaluation and the summary sentence for evaluation, and evaluate the performance of the summary model related to factual consistency based on the calculated conditional likelihood.

For example, the generating system 10 may calculate the conditional likelihood of the summary model for a text sample for evaluation and a summary sentence for evaluation having low relevance and evaluate the performance of the summary model based on the calculated conditional likelihood (e.g., the generating system 10 evaluates that the performance of the summary model is higher as the calculated conditional likelihood is lower). Specifically, as illustrated in FIG. 13, the generating system 10 may input a text sample 131 for evaluation to a summary model 133 and repeatedly perform a decoding step. In addition, the generating system 10 may calculate the conditional likelihood based on (e.g., by summing up) confidence scores (e.g., 136 and 137) for tokens of the summary sentence (that is, tokens constituting a summary sentence 132 for evaluation) among confidence scores 134 and 135 for all tokens calculated in each decoding step.

Here, the text sample for evaluation is at least partially different from an original text sample corresponding to the summary sentence for evaluation, and may be, for example, a negative sample generated from the original text sample, a sample designated by the user, or the like. Alternatively, a text sample and a summary sentence that do not correspond to a pair in a dataset for evaluation composed of data pairs that are a corresponding relationship (or have high relevance) may be used for evaluation.

As another example, the generating system 10 may calculate a first conditional likelihood for a text sample for evaluation and a summary sentence for evaluation having low relevance, calculate a second conditional likelihood for a text sample for evaluation and a summary sentence for evaluation having high relevance, and evaluate the performance of the summary model based on a difference between the first conditional likelihood and the second conditional likelihood. In such a case, it may be evaluated that the performance of the summary model is higher as a difference between the first and second conditional likelihoods is greater.

In the previous examples, the generating system 10 may calculate the conditional likelihood for the summary model using only confidence scores of tokens corresponding to the main keywords (i.e., keywords representing a factual relationship) among the tokens constituting the summary sentence for evaluation. Alternatively, the generating system 10 may calculate the conditional likelihood for the summary model in a manner of assigning higher weights to the confidence scores of the tokens corresponding to the main keywords (i.e., the keywords representing the factual relationship) (i.e., assigning higher weights to the confidence scores of these tokens as compared with other tokens). In this way, the performance of the summary model related to the factual consistency may be more accurately evaluated.

Hereinafter, a method for evaluating performance of a summary model according to some other example embodiments of the disclosure will be described with reference to FIG. 14.

The present example embodiment relates to a method for evaluating performance of a summary model using a relative saliency of a summary sentence prefix with respect to an input text sample (hereinafter, abbreviated as a 'relative saliency') as an evaluation metric. Here, the summary sentence prefix may be tokens (i.e., a token sequence) predicted in the previous decoding step, and refers to tokens (e.g., see input tokens 48 and 49 of FIG. 4) input again to the summary model (i.e., a decoder) in a current decoding step. The relative saliency may be understood as an index quantitatively indicating to which of the input text sample or the summary sentence prefix the summary model pays more attention when generating the summary sentence.

The reason why the relative saliency may be used as an evaluation metric for factual consistency is that a summary model having low factual consistency performs decoding while paying more attention to the summary sentence prefix (e.g., the summary model having the low factual consistency may output a token causing distortion of a factual relationship while focusing more on a context of the summary sentence prefix than on the input text sample) when a data pair (i.e., a text sample and a summary sentence) having low factual consistency (or relevance) is input, whereas a summary model having high factual consistency are more likely to pay attention to the input text sample.

A saliency for each token input to the summary model may be calculated based on, for example, Equation 3. In Equation 3, 'Saliency' refers to the saliency, 'D' refers to a text sample for evaluation, and 'Y' refers to a summary sentence prefix (or summary sentence for evaluation). In addition, 'e(x)' refers to an embedding vector of a token 'x' input to the summary model, '$\odot$' refers to element-wise multiplication, and a term related to '$\nabla$' refers to a gradient for 'e(x)' obtained by back-propagating a prediction loss (e.g., a cross-entropy loss). That is, Equation 3 refers to an equation for calculating a saliency of the summary model for the input token x based on element-wise multiplication of an embedding vector of the input token x and a gradient vector. However, a manner of calculating the saliency is not limited thereto, and the saliency may also be calculated in other manners. For example, since a value (or a magnitude) of the gradient vector for the input token x refers to the degree to which the input token x has an influence on an output (i.e., a prediction result) of the summary model (i.e., the degree to which the summary model pays attention), the saliency for the input token x may be calculated based only on the value of the gradient vector for the input token x in some cases.

$$\text{Saliency}_x = \|e(x) \odot \nabla_{e(x)} L_\theta(D, Y)\|_2 \quad \text{[Equation 3]}$$

The relative saliency may be calculated based on, for example, Equation 4. In Equation 4, "SPS' (Summary Prefix Saliency)' refers to the relatively saliency, 'D' refers to a text sample for evaluation, and 'Y' refers to a summary sentence prefix (or a summary sentence for evaluation).

$$SPS = \frac{\sum_{y \in Y} \text{Saliency}_y}{\sum_{x \in D \cup Y} \text{Saliency}_x} \quad \text{[Equation 4]}$$

In the present example embodiment, the generating system 10 may calculate a relative saliency of the summary sentence for evaluation for the text sample for evaluation, and evaluate the performance of the summary model based on the calculated relative saliency. In other words, the generating system 10 may calculate a first saliency (e.g., a denominator of Equation 4) for the text sample for evaluation, calculate a second saliency (e.g., a numerator of Equation 4) for the summary sentence for evaluation, and evaluate the performance of the summary model by comparing the first saliency and the second saliency with each other. Here, the reason why the saliency for the summary sentence for evaluation rather than the summary sentence prefix is calculated is that the summary sentence for evaluation serves as the summary sentence prefix when decoding is performed through a teacher forcing technique. The teacher forcing technique has been already known well by one of ordinary skill in the art, and a detailed description thereof will thus be omitted.

Figure 14:
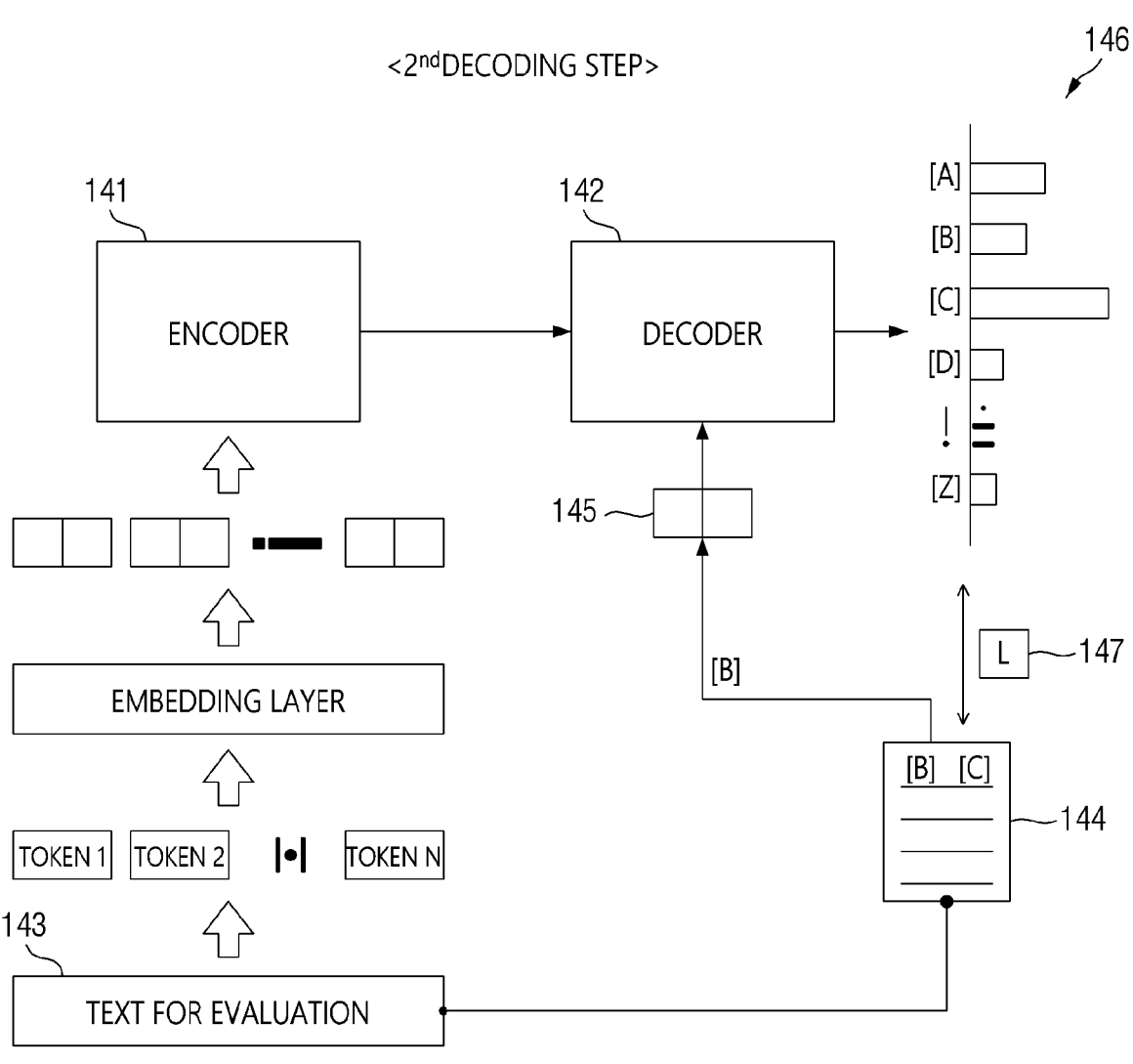
FIG. 14 is an illustrative diagram for describing a method for evaluating performance of a summary model according to some other example embodiments of the disclosure.

For example, as illustrated in FIG. 14, assume that the summary model is composed of an encoder 141 and a decoder 142, and a text sample 143 for evaluation and a summary sentence 144 for evaluation are a data pair having low relevance. In such a case, the generating system 10 may input the text sample 143 for evaluation to the summary model and repeatedly perform a decoding step through the teacher forcing technique (i.e., decoding is repeatedly performed in a manner of inputting tokens of the summary sentence 144 for evaluation to the decoder 142 and predicting the next token). In addition, the generating system 10 may calculate a first saliency for the text sample 143 for evaluation and a second saliency for the summary sentence 144 for evaluation by back-propagating a cross-entropy loss 147 between a prediction result 146 of each decoding step and the summary sentence 144 for evaluation (see Equation 3). In addition, the generating system 10 may calculate a relative saliency based on the first saliency and the second saliency (see Equation 4), and evaluate the performance of the summary model based on the relative saliency. For example, the generating system 10 may evaluate that the performance of the summary model related to factual consistency is higher as the relative saliency according to Equation 4 is calculated as a lower value.

In the previous example, the generating system 10 may calculate the saliency for the summary sentence for evaluation (i.e., the second saliency in the previous example) and the relative saliency for the summary model using only the saliencies of the tokens corresponding to the main keywords (i.e., the keywords representing the factual relationship) among the tokens constituting the summary sentence for evaluation. In addition, in some cases, the generating system 10 may calculate the saliency of the summary sentence for evaluation using only saliencies of tokens other than initial tokens (e.g., about initial 30% of tokens) of the summary sentence for evaluation. In this way, the saliency for the summary sentence for evaluation (or the summary sentence prefix) may be more accurately calculated, and accordingly, the performance of the summary model related to the factual consistency may be more accurately evaluated.

Figure 15:
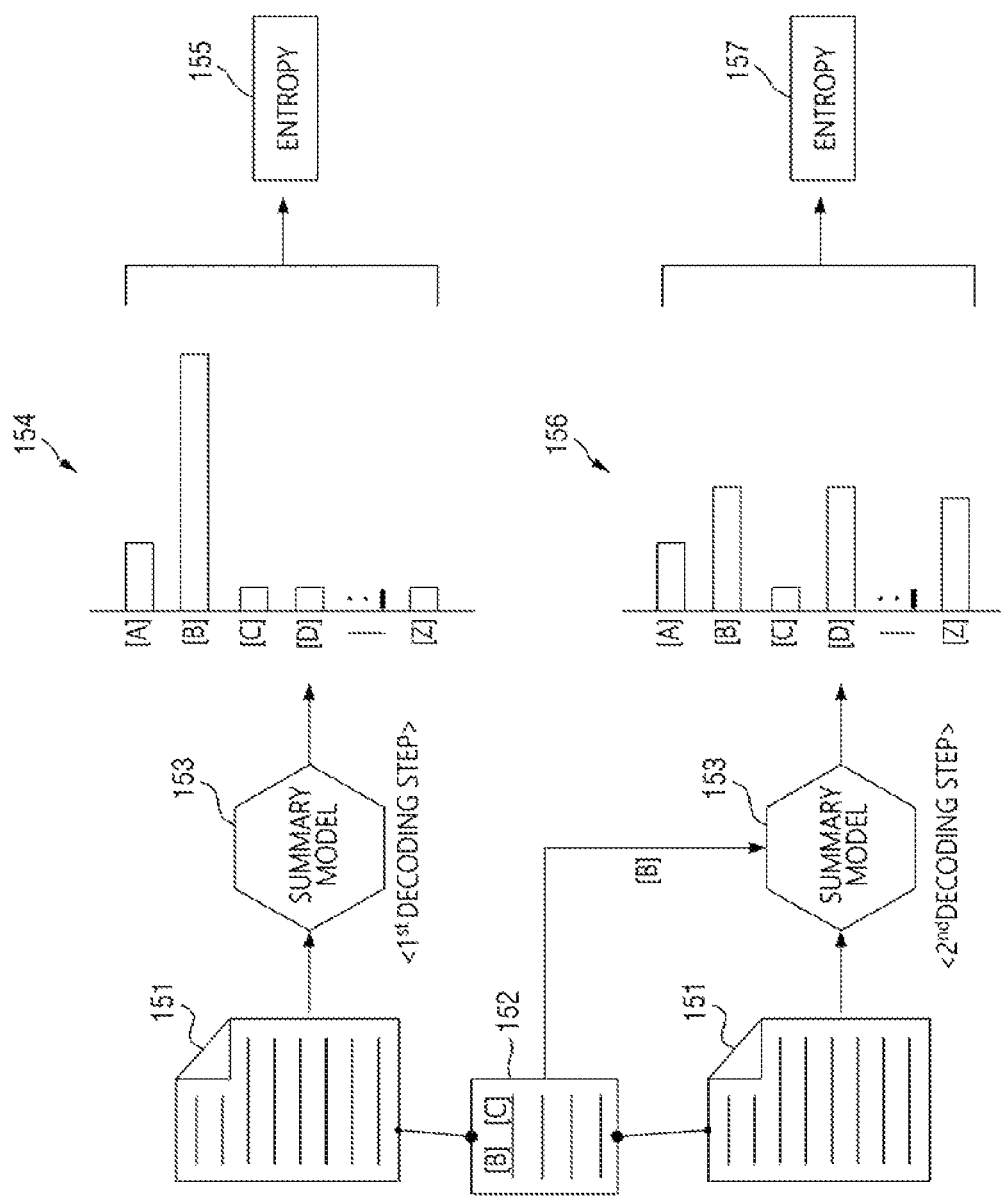
FIG. 15 is an illustrative diagram for describing a method for evaluating performance of a summary model according to some other example embodiments of the disclosure.

Hereinafter, a method for evaluating performance of a summary model according to some other example embodiments of the disclosure will be described with reference to FIG. 15.

The present example embodiment relates to a method for evaluating performance of a summary model using a decoding step-wise entropy (value) as an evaluation metric. Here, the reason why the decoding step-wise entropy (hereinafter referred to as a 'decoding entropy') may be used as an evaluation metric of factual consistency is that it is more likely in a summary model having high factual consistency than in a summary model having low factual consistency that an entropy of a decoding step will rapidly increase when decoding is performed using a data pair (i.e., a text sample and a summary sentence) having low factual consistency (or relevance) (e.g., when a summary sentence having low factual consistency is input through the teacher forcing technique) (i.e., a model having higher factual consistency is more likely to experience confusion when performing prediction).

The decoding entropy may be calculated based on, for example, Equation 5. In Equation 5, '|V|' refers to the number of tokens defined in a token dictionary 'V', '$v_i$' refers to an T-th token defined in the token dictionary V, and '$p_n(v_i)$' refers to a confidence score (i.e., a probability) for the token of an 'n'-th decoding step. For reference, '$p_n(v_i)$' refers to a confidence score when a text sample 'D' for evaluation and tokens 'y' up to an 'n−1'-th token of a summary sentence for evaluation are given, and may thus be understood as a simplified form of $p_n(v_i|D, y_{<n})$.

$$\text{Entropy}_n = -\sum_{i=1}^{|V|} p_n(v_i)\log p_n(v_i) \qquad \text{[Equation 5]}$$

In the present example embodiment, the generating system 10 may calculate the decoding entropy for the text sample for evaluation and the summary sentence for evaluation through the teacher forcing technique, and evaluate the performance of the summary model related to the factual consistency based on the calculated decoding entropy value.

For example, the generating system 10 may calculate a decoding entropy for a text sample for evaluation and a summary sentence for evaluation having low relevance. For example, as illustrated in FIG. 15, the generating system 10 may input a text sample 151 for evaluation into a summary model 153 and repeatedly perform a decoding step through the teacher forcing technique (i.e., the summary sentence for evaluation is input to a decoder of the summary model 153 through the teacher forcing technique). In addition, the generating system 10 may calculate decoding entropies (e.g., 155 and 157) for confidence scores (e.g., 154 and 156) output in each decoding step. Next, the generating system 10 may evaluate the performance of the summary model based on a summed value such as an average of the decoding entropies (e.g., 155 and 157) (e.g., the generating system 10 evaluates that the performance of the summary model related to the factual consistency is higher as the entropy value is greater).

As another example, the generating system 10 may calculate a first decoding entropy for a text sample for evaluation and a summary sentence for evaluation having low relevance, calculate a second decoding entropy for a text sample for evaluation and a summary sentence for evaluation having high relevance, and evaluate the performance of the summary model based on a difference between the first decoding entropy and the second decoding entropy. In such a case, it may be evaluated that the performance of the summary model is higher as a difference between the first and second entropy values is greater.

So far, various example embodiments of the method for evaluating performance of a summary model related to factual consistency have been described with reference to FIGS. 13 to 15. According to that described above, the performance of the summary model related to the factual consistency may be accurately evaluated using the evaluation metrics based on the conditional likelihood, the relative saliency, and/or the decoding entropy.

Hereinafter, an illustrative computing device 180 capable of implementing the above-described generating system 10 will be described with reference to FIG. 16.

FIG. 16 is an illustrative hardware configuration diagram illustrating a computing device 180.

As illustrated in FIG. 16, the computing device 180 may include one or more processors 181, a bus 183, a communication interface 184, a memory 182 loading a computer program executed by the processor 181, and a storage 185 storing the computer program 186. However, only components related to an example embodiment of the disclosure are illustrated in FIG. 16. Additionally, one of ordinary skill in the art to which the disclosure pertains may know that the computing device 180 may further include other general-purpose components in addition to the components illustrated in FIG. 16. That is, the computing device 180 may further include various components in addition to the components illustrated in FIG. 16. In addition, in some cases, the computing device 180 may be configured in a form in which some of the components illustrated in FIG. 16 are omitted. Hereinafter, respective components of the computing device 180 will be described.

The processor 181 may control overall operations of the respective components of the computing device 180. The processor 181 may be configured to include at least one of a central processing unit (CPU), a micro processor unit (MPU), a micro controller unit (MCU), a graphic processing unit (GPU), or any type of processor well known in the art to which the disclosure pertains. In addition, the processor 181 may perform an arithmetic operation on at least one application or program for executing operations/methods according to example embodiments of the disclosure. The computing device 180 may include one or more processors.

Next, the memory 182 may store various data, commands, and/or information. The memory 182 may load the computer program 186 from the storage 185 in order to execute the operations/methods according to example embodiments of the disclosure. The memory 182 may be implemented as a volatile memory such as a random access memory (RAM), but the technical scope of the disclosure is not limited thereto.

Next, the bus 183 may provide a communication function between the components of the computing device 180. The bus 183 may be implemented as various types of buses such as an address bus, a data bus, and a control bus.

Next, the communication interface 184 may support wired/wireless Internet communication of the computing device 180. In addition, the communication interface 184 may support various communication manners other than the Internet communication. To this end, the communication interface 184 may be configured to include a communication module well known in the art to which the disclosure pertains.

Next, the storage 185 may non-temporarily store one or more computer programs 186. The storage 185 may be configured to include a non-volatile memory such as a read only memory (ROM), an erasable programmable (EPROM), an electrically erasable programmable ROM (EEPROM), or a flash memory, a hard disk, a removable disk, or any type of computer-readable recording medium well known in the art to which the disclosure pertains.

Next, the computer program 186 may include one or more instructions for causing the processor 182 to perform operations/methods according to various example embodiments of the disclosure when they are loaded into the memory 181. That is, the processor 181 may perform the operations/methods according to various example embodiments of the disclosure by executing the loaded one or more instructions.

For example, the computer program 206 may include one or more instructions for performing an operation of calculating a likelihood loss for a summary model using a first text sample and a first summary sentence corresponding to the first text sample, an operation of calculating an unlikelihood loss for the summary model using a second text sample and the first summary sentence, and an operation of updating the summary model based on the likelihood loss and the unlikelihood loss. In such a case, the generating system 10 according to some example embodiments of the disclosure may be implemented through the computing device 180.

Meanwhile, in some example embodiments, the computing device 180 illustrated in FIG. 16 may also refer to a virtual machine implemented based on cloud technology. For example, the computing device 180 may be a virtual machine operating on one or more physical servers included in a server farm. In this case, at least some of the processor 181, the memory 182, and the storage 185 illustrated in FIG. 16 may be virtual hardware, and the communication interface 184 may also be implemented as a virtualized networking element such as a virtual switch.

So far, the illustrative computing device 180 capable of implementing the generating system 10 according to some example embodiments of the disclosure has been described with reference to FIG. 16.

So far, various example embodiments of the disclosure and effects according to these example embodiments have been mentioned with reference to FIGS. 1 to 16.

According to some example embodiments of the disclosure, a summary model capable of accurately generating a high-quality summary sentence by performing both likelihood-based training and unlikelihood-based training on the summary model may be built. For example, the likelihood-based training may allow the summary model to well generate main contents of an input original text. In addition, the unlikelihood-based training (e.g., training performed in a direction of decreasing a likelihood using a text sample and a summary sentence that have low relevance) may inhibit the summary model from changing the main contents of the input original text or adding new contents.

In addition, the likelihood-based training may be performed using a text sample and a summary sentence that have high relevance to a factual relationship (i.e., have high factual consistency or correspond to each other), and the unlikelihood-based training may be performed using a text sample and a summary sentence that have low relevance to the factual relationship (i.e., have low factual consistency or do not correspond to each other). In such a case, the summary model may be trained to suppress changing keywords representing the factual relationship in the input original text and generating new keywords, and accordingly, performance of the summary model related to factual consistency may be dramatically improved. That is, the factual consistency of the summary sentence of the original text may be dramatically improved.

In addition, when a first text sample and a summary sentence that correspond to each other (or have high relevance) are given, a negative sample used for the unlikelihood-based training may be easily generated by extracting main keywords from the summary sentence and masking portions related to the main keywords (replacing the portions related to the main keywords with mask tokens) in the first text sample. Furthermore, by variously setting a masking range (e.g., token, token group, sentence, paragraph levels, etc.), various types of negative samples may be easily generated.

In addition, the negative sample may also be generated in a manner of removing the portions related to the main keywords from the first text sample. The negative sample generate as described above may further improve the performance of the summary model by preventing the summary model from using whether or not the mask token appears as a criterion for training.

In addition, a positive sample may be generated in a manner of adding the mask token to the first text sample. The positive sample generate as described above may also further improve the performance of the summary model by preventing the summary model from using whether or not the mask token appears as a criterion for training.

In addition, the performance of the summary model related to the factual consistency may be accurately evaluated using metrics based on a conditional likelihood, a relative saliency, and/or a decoding step-wise entropy value.

The effects according to the technical spirit of the disclosure are not limited to the aforementioned effects, and various other effects may be obviously understood by one of ordinary skill in the art to which the disclosure pertains by referencing the detailed description of the disclosure given below.

The technical features of the disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the example embodiments without substantially departing from the principles of the disclosure. Therefore, the disclosed example embodiments of the disclosure are used in a generic and descriptive sense only and not for purposes of limitation.

What is claimed is:

1. A method for generating a summary, the method being performed by at least one processor and comprising:

calculating a likelihood loss for a summary model using a first text sample and a first summary sentence corresponding to the first text sample, wherein the summary model is a neural network-based model;

calculating a first unlikelihood loss for the summary model using a second text sample and the first summary sentence and calculating a second unlikelihood loss for the summary model using a third text sample and the first summary sentence, the second text sample and the third text sample being negative samples generated from the first text sample in different manners, and the third text sample being generated by removing a portion associated with a main keyword from the first text sample;

updating weight parameters of the summary model based on the likelihood loss, the first unlikelihood loss, and the second unlikelihood loss, in a manner such that a likelihood that the first summary sentence is generated from the first text sample increases, a likelihood that the first summary sentence is generated from the second text sample decreases, and a likelihood that the first summary sentence is generated from the third text sample decreases;

updating the summary model to include the updated weight parameters; and generating a summary of an input text sample using the updated summary model.

2. The method of claim 1, wherein the first or second unlikelihood loss is calculated based on a difference between a summary sentence of the second or third text sample generated through the summary model and the first summary sentence, and is calculated as a smaller value as the difference increases.

3. The method of claim 1, wherein the calculating of the first unlikelihood loss comprises:

extracting the main keyword from the first summary sentence; and generating the second text sample by masking the a portion associated with the main keyword in the first text sample.

4. The method of claim 3, wherein the main keyword is extracted by performing part-of-speech analysis or named entity recognition on the first summary sentence.

5. The method of claim 3, wherein the main keyword comprises a keyword of which a part of speech is a numeral or a proper noun.

6. The method of claim 3, wherein the portion associated with the main keyword is a token group including a matching token for the main keyword and adjacent tokens of the matching token, a sentence including the matching token, or a paragraph including the matching token.

7. The method of claim 3, wherein the generating of the third text sample comprises:

extracting a plurality of sentences from a text sample different from the first text sample; and generating the third text sample by inserting the plurality of sentences into the first text sample from which the portion associated with the main keyword is removed such that an order of the plurality of sentences is maintained.

8. The method of claim 1, wherein the likelihood loss is a first likelihood loss, the second text sample is generated by replacing a portion of the first text sample with a mask token, the method further comprises:

generating a fourth text sample by adding the mask token to the first text sample; and calculating a second likelihood loss for the summary model using the fourth text sample and the first summary sentence, and the weight parameters of the summary model are updated based on the first likelihood loss, the second likelihood loss, the first unlikelihood loss, and the second unlikelihood loss.

9. The method of claim 1, wherein the updating of the weight parameters of the summary model comprises:

summing up the likelihood loss, the first unlikelihood loss, and the second unlikelihood loss based on pre-assigned weights; and updating the weight parameters of the summary model based on the summed loss, and a weight assigned to the likelihood loss is higher than a weight assigned to the first or second unlikelihood loss.

10. The method of claim 1, wherein the summary model is a model predicting tokens constituting a summary sentence of the input text sample in an auto-regressive manner, and the method further comprises:

obtaining a text sample for evaluation and a summary sentence for evaluation, the text sample for evaluation being at least partially different from a text sample corresponding to the summary sentence for evaluation;

calculating confidence scores for tokens constituting the summary sentence for evaluation by inputting the text sample for evaluation to the summary model; and evaluating performance of the summary model based on the calculated confidence scores.

11. The method of claim 1, wherein the summary model is a model predicting tokens constituting a summary sentence of an input text sample in an auto-regressive manner, and the method further comprises:

obtaining a text sample for evaluation and a summary sentence for evaluation;

predicting a plurality of tokens by inputting the text sample for evaluation to the summary model and performing decoding through a teacher forcing technique, the teacher forcing technique being performed in a manner of providing the summary sentence for evaluation to the summary model; and evaluating performance of the summary model by comparing a first saliency of the summary model for the input text sample for evaluation appearing in a process of predicting the plurality of tokens and a second saliency for the provided summary sentence for evaluation with each other.

12. The method of claim 11, wherein the first saliency is calculated based on gradient values for tokens of the text sample for evaluation obtained by back-propagating prediction losses of the plurality of tokens.

13. The method of claim 1, wherein the summary model is a model predicting tokens constituting a summary sentence of the input text sample in an auto-regressive manner, and the method further comprises:

obtaining a text sample for evaluation and a summary sentence for evaluation, the text sample for evaluation being at least partially different from a text sample corresponding to the summary sentence for evaluation;

calculating a confidence score for each token by inputting the text sample for evaluation to the summary model and performing decoding through a teacher forcing technique, the teacher forcing technique being performed in a manner of providing the summary sentence for evaluation to the summary model; and evaluating performance of the summary model based on an entropy value for the confidence score for each token.

14. The method of claim 13, wherein the entropy value is a first entropy value, and the evaluating of the performance of the summary model comprises:

calculating a second entropy value for the text sample corresponding to the summary sentence for evaluation by inputting the text sample corresponding to the summary sentence for evaluation into the summary model and performing decoding through the teacher forcing technique; and evaluating the performance of the summary model based on a difference between the first entropy value and the second entropy value.

15. A system for generating a summary, comprising:

one or more processors; and a memory configured to store one or more instructions, wherein the one or more processors, by executing the stored one or more instructions, perform:

calculating a likelihood loss for a summary model using a first text sample and a first summary sentence corresponding to the first text sample, wherein the summary model is a neural network-based model;

calculating a first unlikelihood loss for the summary model using a second text sample and the first summary sentence and calculating a second unlikelihood loss for the summary model using a third text sample and the first summary sentence, the second text sample and the third text sample being negative samples generated from the first text sample in different manners, and the third text sample being generated by removing a portion associated with a main keyword from the first text sample;

updating weight parameters of the summary model based on the likelihood loss, the first unlikelihood loss, and the second unlikelihood loss, in a manner such that a likelihood that the first summary sentence is generated from the first text sample increases, a likelihood that the first summary sentence is generated from the second text sample decreases, and a likelihood that the first summary sentence is generated from the third text sample decreases;

updating the summary model using the updated weight parameters; and generating a summary of an input text sample using the updated summary model.

16. A non-transitory computer-readable recording medium storing a computer program, which, when executed by at least one processor, causes the at least one processor to perform:

calculating a likelihood loss for a summary model using a first text sample and a first summary sentence corresponding to the first text sample, wherein the summary model is a neural network-based model;

calculating a first unlikelihood loss for the summary model using a second text sample and the first summary sentence and calculating a second unlikelihood loss for the summary model using a third text sample and the first summary sentence, the second text sample and the third text sample being negative samples generated from the first text sample in different manners, and the third text sample being generated by removing a portion associated with a main keyword from the first text sample;

updating weight parameters the summary model based on the likelihood loss, the first unlikelihood loss, and the second unlikelihood loss, in a manner such that a likelihood that the first summary sentence is generated from the first text sample increases, a likelihood that the first summary sentence is generated from the second text sample decreases, and a likelihood that the first summary sentence is generated from the third text sample decreases;

updating the summary model to include the updated weight parameters; and generating a summary of an input text sample using the updated summary model.

* * * * *